United States Patent [19]

Martin

[11] Patent Number: 5,499,328
[45] Date of Patent: Mar. 12, 1996

[54] LINE DRAW METHOD FOR GENERATING, STORING AND DISPLAYING LINES IN A DISPLAY SYSTEM

[75] Inventor: Kevin B. Martin, San Jose, Calif.

[73] Assignee: Network Computing Devices, Inc., Mountain View, Calif.

[21] Appl. No.: 660,285

[22] Filed: Feb. 22, 1991

[51] Int. Cl.$^6$ .................................................. G06T 11/00
[52] U.S. Cl. .......................................... 395/143; 395/133
[58] Field of Search ........................... 395/143, 118–121, 395/133, 139, 140–142; 358/133, 464

[56] References Cited

U.S. PATENT DOCUMENTS

| | | | |
|---|---|---|---|
| 4,710,885 | 12/1987 | Litteken | 395/147 |
| 4,816,913 | 3/1989 | Harney et al. | 358/133 |
| 4,872,064 | 10/1989 | Tutt et al. | 358/464 |
| 4,952,922 | 8/1990 | Griffin et al. | 395/121 X |
| 4,996,653 | 2/1991 | Butler et al. | 395/143 |

*Primary Examiner*—Almis R. Jankus
*Attorney, Agent, or Firm*—Fliesler, Dubb, Meyer & Lovejoy

[57] ABSTRACT

A line-draw method and apparatus that draws lines at fast speeds. Lines are drawn a pixel at a time and a number of algorithms are employed to determine the pixels to be drawn. The line-draw method determined is a function of line length, typical length categories are short, medium and long. For short lines, a table look-up method is employed. For longer length lines, a multi-pixel segment method (burst method) is employed. Burst methods are line-draw methods which draw lines using a plurality of multi-pixel segments to draw the lines where each segment is characterized as having a number (U) of unconditional pixels which are always drawn and an actual number (A) of conditional pixels which are drawn. The actual number (A) is any number up to a maximum number (C) of conditional pixels which can be drawn.

32 Claims, 7 Drawing Sheets

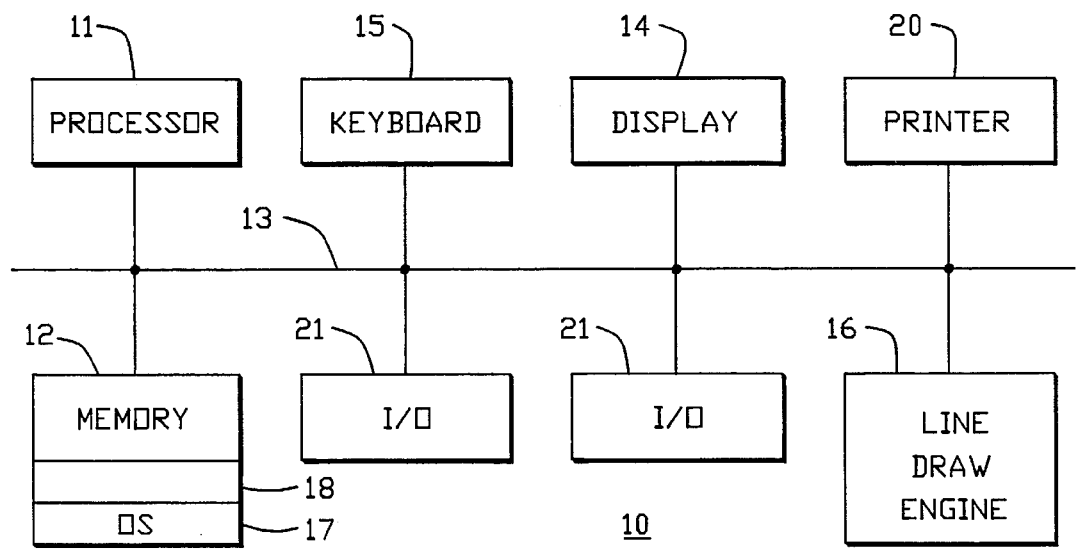
FIG.−1
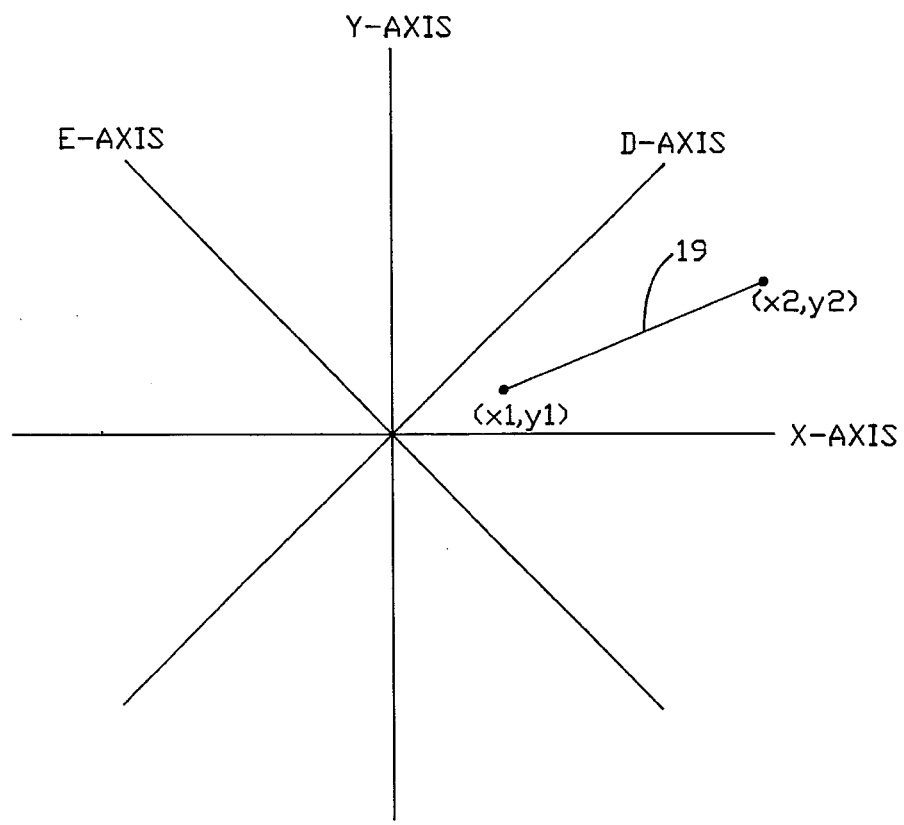
FIG.−2

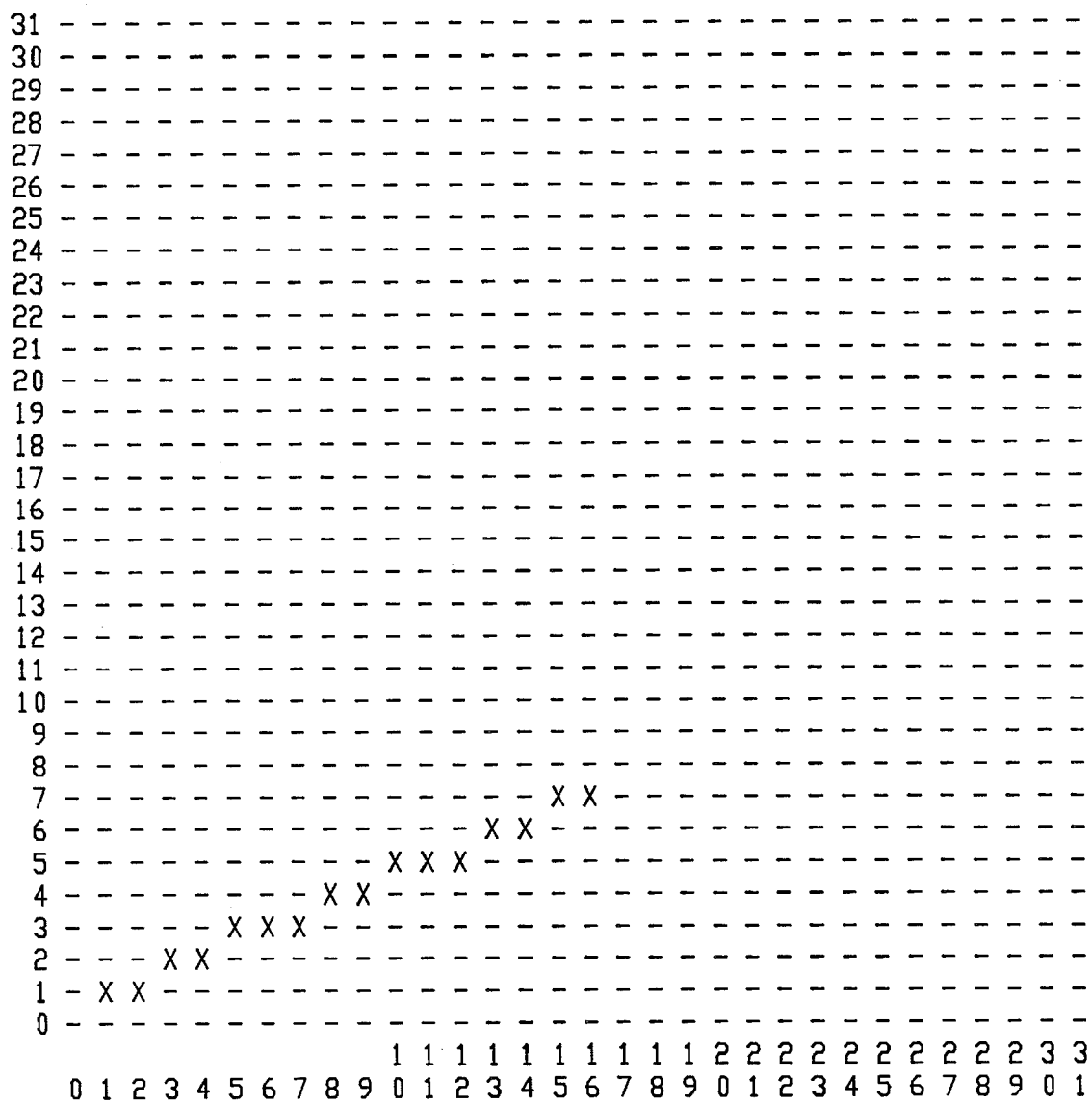
FIG.—4

LONG-LENGTH LINE FROM (4,26) TO (18,5): E-AXIS IS MAJOR AXIS

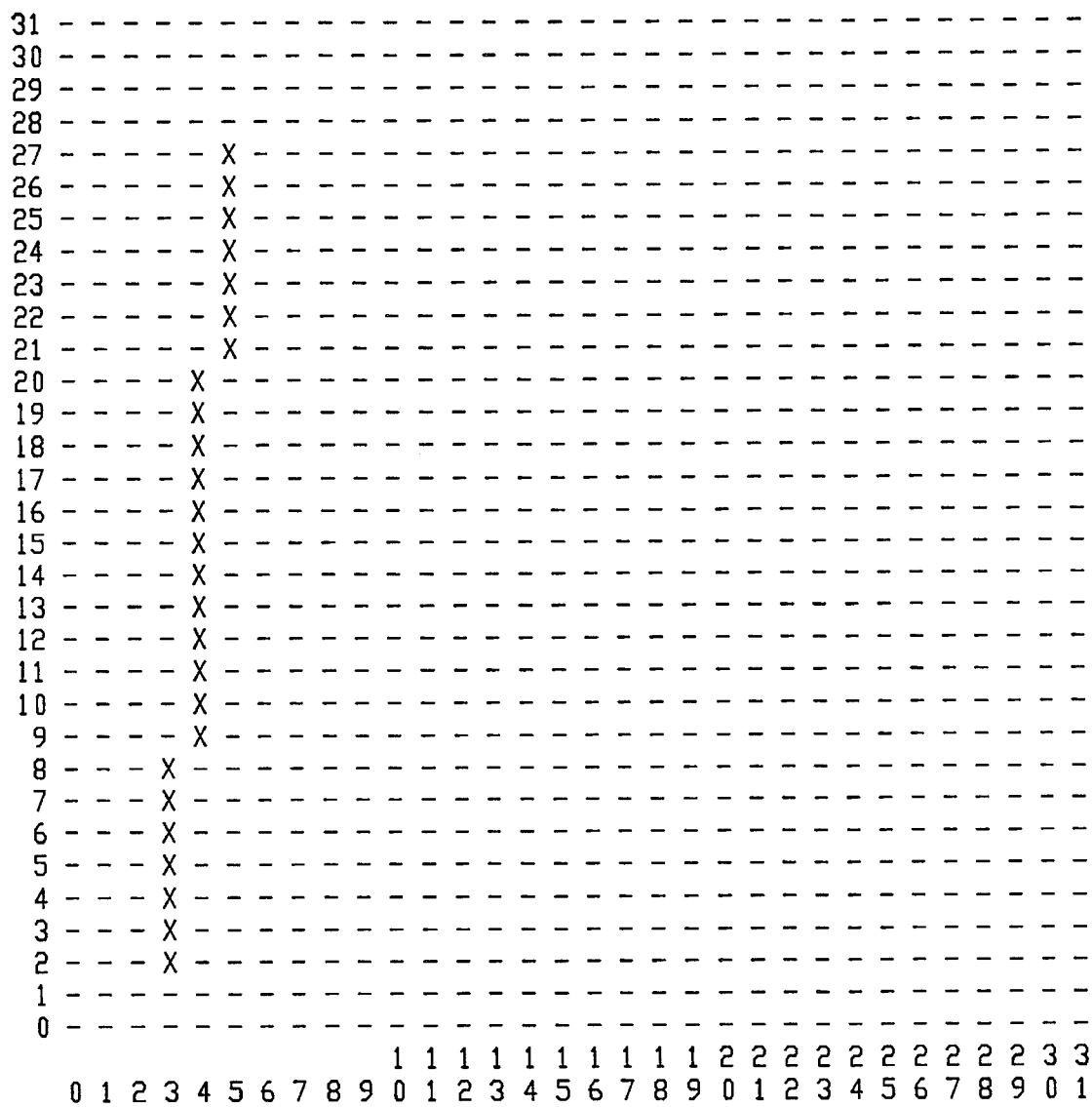
FIG.−6

LINE DRAW METHOD FOR GENERATING, STORING AND DISPLAYING LINES IN A DISPLAY SYSTEM

BACKGROUND OF THE INVENTION

This invention relates to a line-draw method and apparatus for generating, storing and displaying lines in a display system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In display systems that draw lines, each pixel (point) on the line is located and addressed by an X-axis coordinate and a Y-axis coordinate defined relative to an XY-axes system where an X-axis and an orthogonal Y-axis form a matrix of addressable pixels. A pixel is drawn by determining the X-axis and Y-axis coordinates for the pixel and a line is drawn by determining the X-axis and Y-axis coordinates for all the pixels on the line that are used to draw the line.

By way of background, a number of line-draw methods are described by Newman and Sproull in PRINCIPLES OF INTERACTIVE COMPUTER GRAPHICS, Second Edition, McGraw-Hill Book Company, 1979. One such well-known method is Bresenham's Algorithm which draws a line a pixel at a time.

The Bresenham method operates such that for each new pixel to be drawn, a new iteration of the algorithm changes one of the X-axis or Y-axis coordinate values relative to the values for the previous pixel by +1 or −1. The other coordinate value of the new pixel may or may not change, depending on the value of an error term, e. The error term represents the distance, measured perpendicular to the axis of greatest movement, between the exact path of the line and the location of the actual pixels used to draw the line.

Bresenham's method may be applied to a line with any orientation. Irrespective of how the line is actually oriented relative to the coordinate system, the Bresenham method operates essentially the same as if the line were rotated into the upper right-hand quadrant of an XY-axes system. For a line which is located in the upper right-hand quadrant of an orthogonal system and which is also positioned radially from the origin and running between the 45' line and the X-axis, then the X-axis increment of the line, $\Delta x$, changes faster than the Y-axis increment, $\Delta y$. In such an example, where the X-axis is the axis of greatest change (that is, $0 \leq \Delta y \leq \Delta x$), the error term e is measured parallel to the y axis.

Assuming an orientation where the X-axis is the axis of greatest change, each iteration of the algorithm adds the slope of the line, $\Delta y/\Delta x$, to the error term e. Before this addition, the sign of e is used to determine whether to increment the y coordinate of the current pixel. A positive e value indicates that the exact path of the line lies above the current pixel so that the y coordinate is incremented, and 1 is subtracted from e. If e is negative, the y coordinate value is left unchanged.

The Bresenham algorithm is expressed by the following PASCAL program of TABLE 1, which requires neither divisions nor multiplications and in which all variables are integers:

TABLE 1

```
e: = 2 * deltay − deltax;
for i: = 1 to deltax do begin
    Plot(x,y);
    if e>0 then begin
        y: = y + 1
        e: = e + (2 * deltay −2 * deltax)
    end
    else e: = e + 2 * deltay
    x: = x + 1
end
```

Bresenham's algorithm avoids generating duplicate pixels and also avoids multiplications and divisions so that it is well suited to implementation in either hardware or software.

When implemented in software, the Bresenham algorithm typically employs an inner loop such that X-axis and Y-axis coordinates for a single pixel are generated for every iteration of the inner loop.

An example of a typical inner loop of well-optimized Bresenham code for a Motorola 68020 processor drawing a line that is more horizontal than vertical is given in TABLE 2. Only the inner loop is shown, since the inner loop dominates performance in drawing long lines. In the display system, it is assumed that the display buffer has eight planes and is organized such that the processor can access a single pixel with a byte operation.

TABLE 2

| bres1: | |
|---|---|
| moveb | d0,a0@ |
| add | a1,a0 |
| add | d2,d1 |
| bcc | bres2 |
| add | a2,a0 |
| add | d3,d1 |
| bres2: | |
| dbra | d4,bres1 |

The Bresenham method and other line-draw methods are inefficient in that they require one test of the error term for each pixel to be generated, that is, they generate one pixel at a time. For a large number of pixels in a line, the length of time required to draw the line approaches an amount that is directly related to the number of pixels in the line. In many embodiments where line drawing speed is an important parameter of the display system, the Bresenham algorithm is too slow.

Accordingly, and in accordance with the above background, there is a need for improved line-draw methods and apparatus which are capable of improved line-draw speeds.

SUMMARY OF THE INVENTION

The present invention is a line-draw method and apparatus that draws lines at fast speeds. Lines are drawn a pixel at a time and a number of algorithms are employed to determine the pixels to be drawn. Lines to be drawn are categorized by their directions (orientations relative to axes) and by their lengths.

The direction (orientation) of a line is described relative to an XY-axes system which has an X-axis and an orthogonal Y-axis and relative to a DE-axes system which has a D-axis and an orthogonal E-axis. The DE-axes system is rotated 45 degrees about a common origin relative to the XY-axes system and hence is termed the diagonal system. Different line-draw methods are provided for axial lines and for lines in different length categories. Each method is particularly suited for the axial alignment or length of the line. For axial lines, any well-known axial line-draw method is employed. Typically, length categories are short, medium and long.

For short lines, a table look-up method is employed to determine the pixels to be drawn. The look-up table is implemented directly as part of the executable code or is implemented as a separate data store. In either implementation, the coordinate values for pixels are obtained quickly. For longer length lines and as the length of the line to be drawn increases, the number of pixels to be stored in the look-up table increases dramatically, that is, the number of lines of code (for the executable code embodiment) or the memory size (for the data store embodiment) increases dramatically. At some line length (medium length and above), the cost may render the table look-up method unacceptable for practical systems.

For lines of varying length, such as medium and long length lines, a multi-pixel segment method (burst method) is employed. Burst methods are line-draw methods which draw lines using a plurality of multi-pixel segments to draw the lines where each segment is characterized as having a number (U) of unconditional pixels which are always drawn and an actual number (A) of conditional pixels which are drawn. The actual number (A) is any number up to a maximum number (C) of conditional pixels which can be drawn. In order to determine the actual number (A) of pixels drawn, an error term is tested to determine if a conditional-pixel condition is satisfied. The conditional-pixel condition is tested by comparing an error term with a threshold once for each conditional pixel. Up to A+1 tests, but not more than C tests of the error term are made per segment. If the conditional-pixel condition is satisfied (error threshold is exceeded), the conditional pixel is drawn and if not satisfied, the conditional pixel is not drawn.

The pixels for each segment of a line are determined sequentially in three parts, namely beginning, middle and end parts. Each beginning and end part is formed of one segment and the middle part is formed of one or more segments where each segment includes a number of pixels. The segment length, SL, for any particular segment is defined as the number of unconditional pixels which are always drawn and the number of conditional pixels which are actually drawn when conditional-pixel conditions are satisfied.

A line, L, is represented as a series of segments, S, including the segments S1, S2, S3, . . . , S(n−1), Sn where S1 is the beginning segment, S2, S3, . . . , S(n−1) are the middle segments and Sn is the end segment.

The pixels, whether conditional or unconditional, used to form each segment are selected as a sequence of horizontal, vertical or diagonal pixels relative to the XY-axes or relative to the DE-axes coordinate systems.

If the line to be drawn is more horizontal than diagonal, closer to the X-axis than to the D-axis or E-axis, segments of horizontal pixels along the X-axis are used. If the line is more vertical than diagonal, closer to the Y-axis than to the D-axis or to the E-axis, segments of vertical pixels along the Y-axis are used. If the line is more diagonal than horizontal or vertical, closer to the D-axis or E-axis than to either the X-axis or Y-axis, segments of diagonal pixels along the D-axis or E-axis are used.

The closest axis (X, Y, D, E) to any given line to be drawn is determined to be the major axis (X or D, or Y or E) and the other orthogonal axis (Y or E, or X or D) is the minor axis. Each line has a projection onto the axes, that is, a major axis projection, da, and a minor axis projection, db. These projections da and db together with the axes system, XY-axes or DE-axes, uniquely determine the direction and length of a line.

The average segment length (ASL) of a line is da/db. The number of segments required to draw a line is equal to db+1, including the beginning, middle and end segments. The total number of middle segments used to draw a line is equal to db−1. In order to draw a line, the length of each segment forming the line must be determined, that is, the length of the beginning and end segments and the lengths of all the middle segments are determined.

In order to determine which conditional pixels are to be drawn, a determination of the lengths of any segment must be made. For each segment, conditional-pixel conditions (error terms compared against a threshold) are used to choose between drawing the segment with a number of pixels equal to the "floor" length in pixels or with a number of pixels equal to the "ceiling" length in pixels. The "floor" length is the greatest integer not greater than some value and the "ceiling" is the smallest integer not less than that value where, for beginning and end segments, the value is one-half the average segment length (ASL/2) and for middle segments the value is the average segment length (ASL). The conditional-pixel condition is evaluated once for each conditional pixel drawn.

In the multi-pixel segment methods, the error terms are manipulated only once per conditional pixel and not for the unconditional pixels, and hence multiple pixels for a segment are determined and drawn more rapidly than when error terms are manipulated once for every pixel. The larger the number of unconditional pixels per segment, the less time spent determining the conditional-pixel condition and hence the faster the line can be drawn.

When the multi-pixel segment method (the burst method) is embodied in computer code for a line draw program, the determination of the unconditional and the conditional pixels to be drawn for each segment is implemented within a segment loop (outer loop). To draw a line, the segment loop is executed once for each segment of the line.

In order that a line-draw program be able to draw any line of arbitrary direction and length, the computer program includes a complete set of segment loops. Since any particular segment loop may not be able to draw all lines, different segment loops within the complete set draw different ones of the lines.

Lines of arbitrary direction and length are characterized as having arbitrary Average Segment Length, ASL (where ASL is equal to da/db). Each segment loop within the complete set of segment loops typically can draw only a range of Average Segment Lengths. However, the complete set of segment loops for a line-draw program is chosen to include a complete set of Average Segment Lengths such that any line of arbitrary direction and length (that is, any arbitrary Average Segment Length) may be drawn.

The range that Average Segment Length (ASL) can have is limited such that for some Maximum Line Length (MLL), [ASL≦ MLL]. In a single orothogonal axes system (XY-axes system), ASL is limited such that [1≦ASL ≦(MLL)/2]. In a double orothogonal axes system (XY-axes and DE-axes system),. ASL is limited such that [2≦ASL ≦(MLL)/2].

Multi-pixel segment methods are characterized as having either a fixed maximum number of conditional pixels or as having a variable maximum number of conditional pixels. When such fixed or variable maximum conditional number of pixels are embodied in computer code, evaluation of the actual number of conditional pixels, when the maximum number is variable, can be implemented as a conditional-pixel loop (inner loop). When the maximum number of conditional pixels is fixed, no inner loop is required. Accordingly, line-draw methods are characterized as single loop (segment loop only) or double loop (segment loop and conditional-pixel loop).

For single loop line-draw methods (segment loop only), the line is drawn with a single segment loop in which a number U of unconditional pixels and an actual number A of conditional pixels are drawn where the actual number A is up to C conditional pixels where C is the maximum number of conditional pixels which can be drawn (where A is determined as a function of the conditional-pixel conditions).

The segment loop or loops chosen to draw a line are selected from the complete set of segment loops available in the computer program based upon the average segment length (ASL) for the line such that, $(U) \leq ASL \leq (U+C)$ where since U and C are integers,
$U \leq \text{floor}[ASL]$ $\text{ceiling}[ASL] \leq (U+C)$ and where:
floor[ASL]=floor of average segment length (ASL) ceiling[ASL]=ceiling of average segment length (ASL) Average Segment Length (ASL)=da/db The condition $(U) \leq ASL \leq (U+C)$ is sufficient to guarantee that every segment of the line with segment length SL also satisfies the condition, $(U) \leq SL \leq (U+C)$ since,
floor[ASL]<SL <ceiling[ASL]

$(U) < ASL < (U+C)$

For single loop burst line-draw methods, the number of unconditional pixels (U) is at most one-half the length of the longest line which can be drawn.

For double-loop burst line-draw methods, the line is drawn with a double loop in which the outer loop draws U unconditional pixels and up to C conditional pixels where C is of arbitrary size and where the C conditional pixels are determined one per iteration of the inner loop depending upon the conditional-pixel condition determined by the inner loop. For a double loop method, C is unlimited algorithmically but is limited in actual implementations in some arbitrary manner, for example, by the size of fields in the computer system.

The loop structures of line-draw methods are of interest because such structures relate to the speed with which lines can be drawn. Such speed, of course, affects the performance of the display system and the user satisfaction with the display system when lines are being drawn.

The multi-pixel segments (burst) methods of the present invention are faster than Bresenham's method since, in the present invention, each segment loop execution typically draws a segment with multiple pixels whereas Bresenham's method only draws a single pixel per segment loop execution.

In accord with the above summary, it is an object of the present invention to provide an improved display system which draws lines with a fast speed.

Other objects, features, and advantages of the present invention will become more apparent in the light of the following detailed description thereof, as illustrated in the drawings.

BRIEF DESCRIPTION OF THE DRAWINGS

FIG. 1 depicts a block diagram representation of a display system in accordance with the present invention.

FIG. 2 depicts an XY-axes coordinate system for drawing lines. .

FIG. 4 depicts a medium-length line drawn from coordinates (1,1) to coordinates (16,7) where the X-axis is the Major Axis.

FIG. 5 depicts a long-length line drawn from coordinates (4,26) to coordinates (18,5) where the E-axis is the Major Axis.

FIG. 6 depicts a long-length line drawn from coordinates (5,27) to coordinates (3,2) where the Y-axis is the Major Axis.

DESCRIPTION OF THE PREFERRED EMBODIMENT(S)

Overall System-FIG. 1

Figure 3:
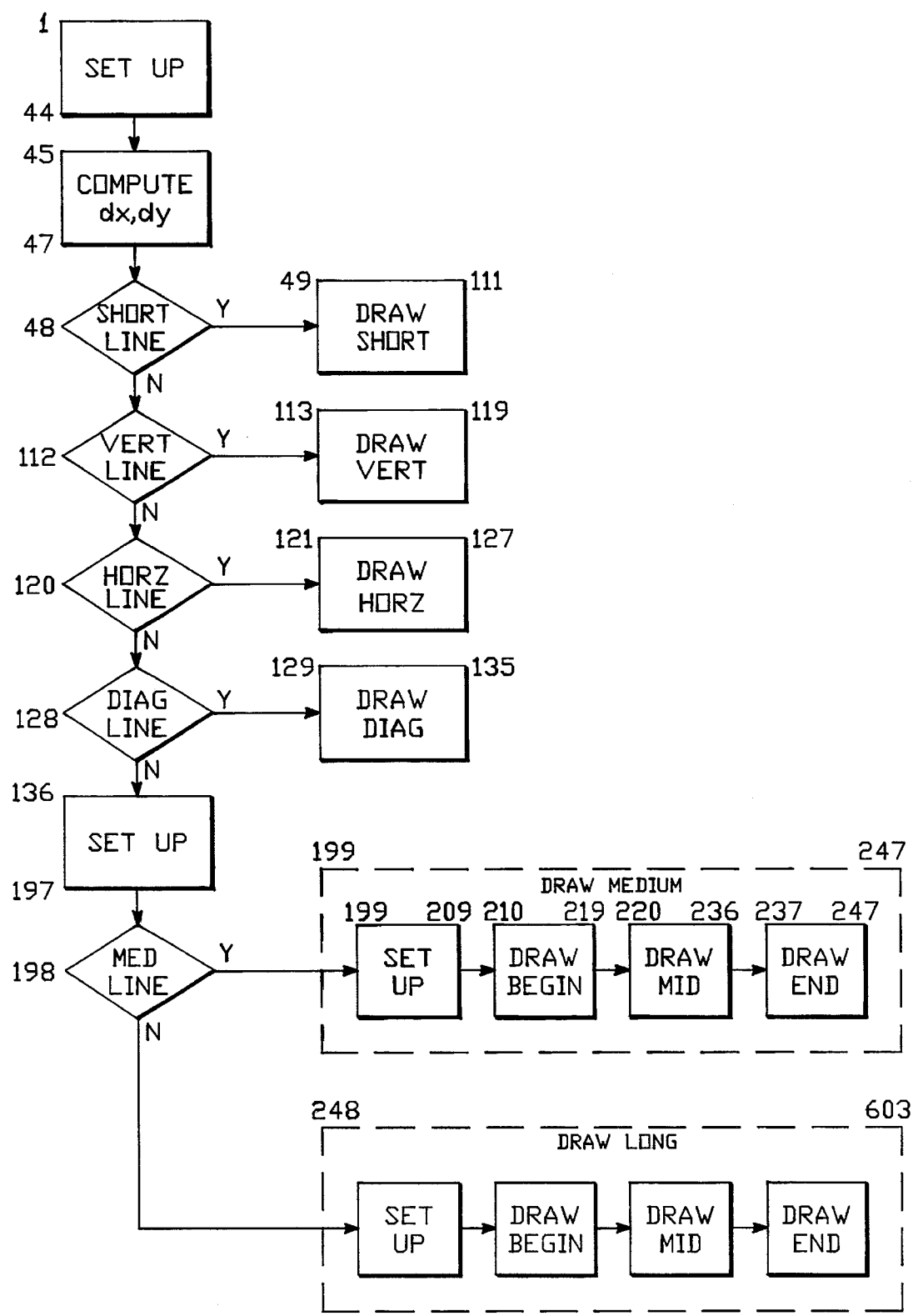
FIG. 3 depicts a block diagram of the line-draw methods executed by the FIG. 1 system.

FIG. 1 depicts a block diagram representation of a display system 10 in accordance with the present invention. Typically, the system 10 is a conventional computer system having a processor (CPU) 11, a memory 12, a display 14, and a keyboard 15.

In the FIG. 1 system, application computer programs 18 are stored in the memory 12 and are executed in the processor 11 under control of a software operating system 17 also stored in memory 12. The operation of such a computer system is well known.

In many application programs executable by the system 10, there is a need to draw lines. Such lines are drawn by a line-draw program and such a line-draw program together with a display system is one embodiment of the present invention. The line draw program is an application program 18, or part thereof, stored in memory 12 and executed by the processor 11.

The application program performs a line-draw method in the apparatus of FIG. 1 to generate and store lines in the memory 12. From the memory 12, the stored lines are displayed in display 14. In line-draw display system of FIG. 1, each pixel (point) on the line is located and addressed by an X-axis coordinate and a Y-axis coordinate defined relative to orthogonal X and Y axes which form a matrix of addressable pixels. A pixel is drawn by determining the X-axis and Y-axis coordinates for the pixel and a line is drawn by determining the X-axis and Y-axis coordinates for all the pixels on the line that are used to define the line.

While a preferred embodiment of the invention employs computer program executing in a general purpose computer as described, a special purpose line-draw processor (engine) 16, as shown in FIG. 1, is also within the scope of the present invention. For example, when the line-draw engine 16 is employed in the FIG. 1 system, the processor 11 is not required to execute the line-draw method since this operation is performed by the special purpose engine 16 which executes the methods of the present invention.

Coordinate System- FIG. 2

In FIG. 2, an XY-axes coordinate system is depicted where the X-axis is horizontal, the Y-axis is vertical, and the D-axis is a diagonal midway between the positive X-axis and positive Y-axis and E-axis is a diagonal midway between the negative X-axis and positive Y-axis. The DE-axes form an orthogonal coordinate system rotated 45 degrees about a common origin relative to the XY-axes.

In FIG. 2, a line 19 to be drawn into the memory 12 and/or to be displayed on the display 14 in accordance with the XY-axes coordinate system of FIG. 2 has a beginning xy coordinate given by (x1, y1) and ending coordinate (x2, y2).

The manner in which the line 19 is drawn changes as a function of the length and orientation of the line 19. If line 19 is a short line, then the line is drawn by a table look-up method. If the line is a medium length line, then line 19 is drawn in accordance with a medium length algorithm. If line 19 is a long length line, then the line is drawn in accordance with a long line algorithm. The most efficient algorithm (short, medium or long) for drawing the line is selected as a function of the length of the line and its orientation.

In general, any line such as line 19 can be represented as a series of shorter horizontal, vertical, or diagonal segments where each segment can be one or more pixels in length. In FIG. 2, line 19 is to be drawn from a first coordinate (x1,y1) to the last coordinate (x2,y2), where x2>x1 and y2>y1. In FIG. 2, (x2–x1)>(y2–y1), so that line 19 is more horizontal than vertical. For line 19, the horizontal lengths in pixels of the middle segments are either the floor of or the ceiling of (x2–x1)/(y2– y1). Error terms are used to choose between drawing each middle segment with a number of pixels equal to the "floor" length or with a number of pixels equal to the "ceiling" length. The pixel lengths of the beginning and end segments for line 19 are either the floor or the ceiling of [(x2–x1)/(y2–y1)]/2. Again, error terms are tested to choose between drawing each beginning and end segment with a number of pixels equal to the "floor" length or with a number of pixels equal to the "ceiling" length.

Since unconditional pixels can be drawn without manipulating the error term, these pixels are drawn rapidly.

A fast algorithm for drawing lines into a bitmap located in memory 12 using a Motorola 68020 microprocessor for processor 11 is given, in assembly language form, in the following TABLE 3 for a single segment loop method. While the Motorola 68020 microprocessor is typical, the algorithm of TABLE 3 applies equally well to any microprocessor or other processor. Using the TABLE 3 method, the greatest performance increases are for long lines which the 68020 processor, for example, can draw twice as fast as the standard Bresenham algorithm.

In TABLE 3, only the inner loop is shown, since the inner loop dominates performance in drawing long lines.

TABLE 3

```
bres1:

moveb       d0,a0@          /* set pixel */
    add         a1,a0
```

TABLE 3-continued

```
    moveb       d0,a0@          /* set pixel */
    addl        a1,a0
    .
    .
    .
    moveb       d0,a0@          /* set pixel */
    add         a1,a0
    add         d2,d1
    bcc         bres2
    moveb       d0,a0@          /* set pixel */
    add         a1,a0
    add         d3,d1
bres2:

add         a2,a0
    dbra        d4,bres1
```

The assembly code of TABLE 3 draws the same pixels as Bresenham's code of TABLE 2 above. Bresenham's code of TABLE 2 draws a single pixel in the inner loop while TABLE 3 draws multiple pixels in the inner loop.

Multi-pixel Segment Loops

In TABLE 4, a complete computer program is listed capable of drawing any line of arbitrary length and orientation (arbitrary Average Segment Length). In the computer program of TABLE 4, multi-pixel segment loops are implemented in various forms. In TABLE 4, the segment loops are of the following categories.

---

1. Single Segment Loop
   Draw a segment of Segment Length SL,
     Execute outer loop,
       Draw up to C conditional pixels
         A maximum of A + 1 tests, but not more
         than C tests, are performed on the
         conditional-pixel condition to determine
         that A conditional pixels will be drawn
       Draw U unconditional pixels
     where,
       $U \leq SL \leq (U + C)$
       $U \leq ASL \leq (U + C)$

---

Example

An example of the Single Segment Loop appears in TABLE 4, Lines 346:365, where C=1 (hence either 0 or 1 unconditional pixel is drawn) as follows:

---

Execute outer loop,                          [Lines 351:363]
  Draw up to C conditional pixels            [Lines 353:358]
    Line 353 is a test of the conditional-pixel
    error term e against a threshold of 0.
  Draw U unconditional pixels                [Lines 358:363]
2. Single Segment Loop With Modified Unconditional Loop
   Draw a segment of Segment Length SL,
     Execute outer loop,
       Draw up to C conditional pixels
       Draw U unconditional pixels
         Execute Unconditional loop "n" times
         where,
           n = U[Div]ULS
           [Div] = operator specifying
             number of integer
             divisions of USL into U
       Draw remainder unconditional pixels, R
     where,
       $U \leq SL \leq (U+C)$
       $U \leq ASL \leq (U+C)$
       ULS = unconditional loop size

```
                    R = U[Mod]ULS
                    [Mod] = modulous operator
```

Example

An example of the Single Segment Loop With Modified Unconditional Loop appears in TABLE 4, Lines 479:509, where U=4n+1 (4 unconditional pixels are drawn for each of "n" executions of the unconditional loop and 1 remainder pixel is drawn where ULS equals 4) and C=1 (either 0 or 1 conditional pixels are drawn) as follows:

```
    Execute outer loop,                        [Lines 484:507]
        Draw up to C conditional pixels        [Lines 486:491]
            Line 486 is the test of the conditional-pixel
            error term against the threshold 0. The code from
            line 487 to 491 is executed at most once,
            possibly drawing a pixel at line 488.
        Execute unconditional pixel Loop "n" times
                                                [Lines 493:504]
            Draw 4 unconditional pixel per execution
                                                [Lines 495:501]
        Draw 1 remainder unconditional pixel    [Line 505]
3. Double Segment Loop
        To draw a segment of length SL,
        Execute outer loop once per segment,
            Draw U unconditional pixels
                Execute inner loop A times
                    Draw one conditional pixel for each
                    iteration of inner loop
                where,
                    U ≦ segment length (SL)
```

Example

An example of the Double Segment Loop appears in TABLE 4, Lines 224:235 as follows:

```
    Execute outer loop,                        [Lines 224:235]
        Draw U unconditional pixels            [Lines 227:231]
        Execute inner loop A times             [Lines 228:233]
            Draw one conditional pixel for each iteration
            of inner loop                      [Line 231]
        where,
            U ≦ segment length (SL)
            U = 2 (using diagonal axes)
            2 ≦ SL
Line-Draw Methods Using Sets of Segment Loops
A. Medium Line Draw                            [Lines 137:247]
    Initialize Medium And Long Lines           [Lines 144:196]
    Initialize Medium Lines                    [Lines 205:208]
    Beginning Segment                          [Lines 210:219]
    Middle Segments (Double                    [Lines 220:235]
    Segment Loops)
        To draw each middle segment of length SL,
        Execute outer loop once per segment,
            Draw U unconditional pixels
            Execute inner loop A times
                Draw one conditional pixel for each
                iteration of inner loop
            where,
                U ≦ segment length (SL)
                U = 2 (using diagonal axes)
                2 ≦ SL
    End Segment                                [Lines 237:247]
B. Long Line Draw
    B.1 Single Segment Loop with C = 1
        Initialize Medium And Long Lines       [Lines 144:196]
        Initialize Long Lines, Begin           [Lines 258:326]
        Segment
        Beginning Segment          [Lines 264:269, 317:322]
        Middle Segments (Single Segment        [Lines 479:509]
            Loops)
                Draw U unconditional pixels
                Draw up to C conditional pixels where C = 1
        End Segment
    B.2 Single Segment Loops With Terminator Double Loop
        Initialize Short And Long Line         [Lines 144:209]
        Beginning Segment
        Middle Segments                        [Lines 479:509]
            Select one of a plurality of single
            segment loops or select the double
            segment loop to draw all middle segment
            loops for a line.
        If double segment loop:
            For each middle segment of length SL,
            Execute outer loop once per segment,
                Draw U unconditional pixels
                Execute inner loop A times
                    Draw one conditional pixel for each
                    iteration of inner loop
                where,
                    U ≦ segment length (SL)
                    U = 2 (using diagonal axes)
                    2 ≦ SL
            For Double Segment Loop, U ≦ (Max U)+1 of
                Single Segment Loops, optimal = (Max U)+1
        If single segment loop:
            Draw U unconditional pixels
            Draw up to C conditional pixels where C = 1
            where
                U ≦ SL ≦ (U + 1)
                U ≦ ASL ≦ (U + 1)
        End Segment
    B.3 Single Segment Loop Segments And Modified Single
        Segment Loop Segments                  [Lines 249:600]
        Beginning Segment
            Initialize                         [Lines 251:260]
            Unconditional Pixel Loop           [Lines 262:275]
            Conditional Pixel Test             [Lines 313:322]
        Middle Segments                        [Lines 342:581]
        Initialize                             [Lines 276:306]
                                               [Lines 323:327]
        For any line, select one of the following Single
            Segment Loops #'s 1 to 8 to be used to draw
            all middle segments. The determination of
            which one of the Single Segment Loops #'s 1
            to 8 is to be selected is based upon the
            value of "nMidPixels"              [Lines 276:306]
                Four Single Segment Loops (#'s 1 to 4):
```

| #   | (U,C)   |                  |
| --- | ------- | ---------------- |
| 1   | (2,1)   | [Lines 346:365]  |
| 2   | (3,1)   | [Lines 367:388]  |
| 3   | (4,1)   | [Lines 390:413]  |
| 4   | (5,1)   | [Lines 415:440]  |

Four Single Segment Loops With Modified Unconditional Loops (#'s 5 to 8):

| #   | (U,C)     |                  |
| --- | --------- | ---------------- |
| 5   | (4n+0, 1) | [Lines 447:477]  |
| 6   | (4n+1, 1) | [Lines 479:509]  |
| 7   | (4n+2, 1) | [Lines 511:543]  |
| 8   | (4n+3, 1) | [Lines 545:579]  |

```
        End Segment                            [Lines 583:599]
            Draw Unconditional Pixels          [Lines 583:590]
            Draw Conditional Pixels            [Lines 592:599]
```

Line-Draw Method-FIG. 3

FIG. 3 depicts a flow chart of the line-draw method executed by the FIG. 1 system. TABLE 4 is the C-language code of a software embodiment corresponding to the FIG. 3 flow chart. The code of TABLE 4 is compiled and executed in the processor of FIG. 1. In FIG. 3, the numbers appearing opposite boxes correspond to the code line numbers in TABLE 4.

(Lines 1:44 TABLE 4). In FIG. 3, set up conditions are established (lines 1:44 of TABLE 4) including defining a short line length (SHORT_LENGTH) from 0 to 2 pixels and a medium line length (MEDIUM_LINE) from 3 to 20 pixels so that a long line is 21 or more pixels. SHORT_LENGTH is the cutoff pixel between the short-length and medium-length algorithms. This value determines the number of cases (nine in the example described) explicitly handled by the short-length algorithm. MEDIUM_LENGTH is the cutoff point between the medium-line algorithm and the long-line algorithm. These values can be adjusted for specific embodiments of the code.

(Lines 45:47 TABLE 4). In FIG. 3, dx and dy are computed from which line length and orientation are determined.

(Line 48 TABLE 4). A short line determination is made.

(Lines 49:111 TABLE 4). If a short line, the short line method DRAW SHORT is performed.

The short line method transforms the dx and dy values to an address for addressing a table of short lines. In the example described in connection with TABLE 4, the short line is defined to be of length of 0, 1, or 2 pixels. These pixel lengths represent nine different lines which are defined by nine cases in TABLE 4, namely, case 0, case 4, case 8, case 1, case 5, case 9, case 2, case 6, and case 10. Depending on the values of dx and dy for a particular short line, one of the nine cases in TABLE 4 is executed to draw the short line. For example, with dx=2, dy=0, a three pixel horizontal line is drawn. For another example, with dx=1, dy=1, a two pixel diagonal line is drawn. Similar lines are drawn for each of the seven cases.

(Line 112 TABLE 4). If not a short line, the vertical line test is performed.

(Lines 113:119 TABLE 4). If a vertical line, the vertical line method DRAW VERT is performed.

(Line 120 TABLE 4). If not a vertical line, the horizontal line test is performed.

(Lines 121:127 TABLE 4). If a horizontal line, the horizontal line method DRAW HORZ is performed.

(Line 128 TABLE 4). If not a horizontal line, the diagonal line test is performed.

(Lines 129:135 TABLE 4). If a diagonal line, the diagonal line method DRAW DIAG is performed.

(Lines 136:197 TABLE 4). If not a short line, vertical line, horizontal line or diagonal line (not an axial line), then setup occurs for a medium or long line.

The following common parameters are computed for both the medium-line and long-line methods.

| | |
|---|---|
| da | **distance in major direction |
| db | **distance in minor direction |
| nextA | **pointer offset to advance in major direction |
| nextAB | **pointer offset to advance in major and minor direction |
| errAdjust | **error adjustment to make reversible vectors |

The error adjustment term 'errAdjust' has two effects:

It enables the medium and long line algorithms to draw the same pixels as Bresenham's algorithm. Without this term, some pixels might be chosen differently when the primary direction is diagonal.

It makes the vectors 'reversible'. (The same pixels are chosen for the vector regardless of the ordering of the endpoints.)

The above parameters, along with the starting position, completely describe the path of the line. The principal direction of the line is determined. There are 16 possible directions for the line, but since the algorithm is symmetric about the x-axis, only the following eight cases need be considered:

1. always move right, sometimes move right and up/down
2. always move right and up/down, sometimes move right
3. always move right and up/down, sometimes move up/down
4. always move up/down, sometimes move right and up/down
5. always move up/down, sometimes move left and up/down
6. always move left and up/down, sometimes move up/down
7. always move left and up/down, sometimes move left
8. always move left, sometimes move left and up/down The inclusion of diagonal directions implies that two pixels are always drawn in the major direction before moving in the minor direction for the middle of the line. This relationship makes the line drawing algorithms more efficient by allowing them to be optimized for the major direction.

(Line 198 TABLE 4). A medium line determination is made.

(Lines 199:247 TABLE 4). If a medium line, the medium line method DRAW MEDIUM is performed.

Medium length lines are drawn in three parts: beginning, middle, and end. Although parameters are the same as in Bresenham's algorithm, there are the following important differences:

1. The use of a diagonal primary direction (d-axis) implies that two pixels are always drawn in the major direction before moving in the minor direction in the 'middle loop'. This makes the 'middle loop' faster because two pixels are drawn before any decisions are made. However, the beginning and end of the line may still consist of a single pixel, so these are drawn separately.
2. Bresenham's algorithm decrements a counter in the major direction to detect the terminating condition while the present method decrements a counter in the minor direction. Since the minor direction is advanced at most half as often as the major direction, and on average about a quarter as often, the present method is considerably faster. Also, the conditional branch which decides whether to continue to advance in the major direction can now perform double duty as loop control. This feature alone makes the 'middle loop' equivalent to an unrolled Bresenham loop, but without the code space required by actually unrolling the loop. Of course, the loop of the present method is actually much faster than an unrolled Bresenham loop because of the 'two pixel' effect described above.
3. Unlike Bresenham's algorithm, there are no branches in the 'middle loop' other than the two loop controls. This makes the code of the present method compact and efficient.

(Line 248:603 TABLE 4). If not a medium line, the long line method DRAW LONG is performed.

The long line algorithm draws long lines by breaking them up into horizontal, vertical, or diagonal segments. This choice is reflected by the values of nextA, nextAB, da and db.

The general algorithm is as follows:
1. Draw the beginning segment of the line.
2. Draw all middle segments of the line. An appropriate loop is chosen to match the segment length.
3. Draw the end segment of the line.

Every segment (including the beginning and end segments) consists of a fixed number of unconditional pixels which are always drawn and one conditional pixel which may optionally be drawn depending on the value of the error term at that point in the line.

The length of the middle segment without the conditional pixel is as follows:

nMidPixels=da div db

The lengths of the beginning and end segments without the conditional pixel are as follows:

nStartPixels=nEndPixels=nMidPixels div 2

The vectors drawn by this algorithm are 'reversible' (that is, the same pixels are drawn regardless of the ordering of the end points). This result is implemented with the 'errAdjust' term to bias the conditional tests within the drawing loops. The loop to draw the beginning segment does several things at once:

1. Draws all unconditional pixels in the beginning segment.
2. Computes the number of unconditional pixels in the beginning and end segments, which is used to compute the number of unconditional pixels in each middle segment. These values are given as follows:

nMidPixels=(int)(da/db)

nEndPixels=(int)(nMidPixels/2)

3. Computes the error term for the unconditional pixels in the beginning and end segments. These values are needed when the conditional pixel of the end segment is drawn, and are used to compute the error term for the unconditional pixels in each middle segment. These values are given as follows:

*errMidSegment=2 * da−nMidPixels * 2 * db*

*errEndSegment=da −nEndPixels * 2 * db*

The advantages of using this loop instead of a divide to compute nMidPixels and nEndPixels are as follows:

1. The loop is needed to draw the beginning segment of the line anyway; the main difference is that an extra add instruction is required to keep count in this loop ('nEndPixels++').
2. On average, the loop is executed twice, so the extra add along with the other computations (below) take many fewer ticks than a divide for most processors.
3. The loop overlaps the computation with memory operations, which can hide the ticks required for the extra instructions.

In the embodiment of TABLE 4, the fast long-line and medium-line algorithms for drawing solid lines are based upon the following target computer system.

The pixmap memory in memory 12 of FIG. 1 is organized as 8 bits (one byte) per pixel, with consecutive bytes in memory representing consecutive pixels in increasing x direction in the pixmap. One theoretical embodiment of the long-line algorithm implies infinite code size to draw lines of arbitrary length when those lines approach nearly horizontal, vertical, or diagonal. Since infinite code size is not possible in any practical system, this limitation is overcome by employing unconditional loops with unconditional loop size, ULS, when the length of individual segments within the line exceed some arbitrary length.

In the embodiment of TABLE 4, ULS is arbitrarily chosen as 4 although any finite ULS is possible. A ULS which is a power of 2 is desireable for optimum performance. The references to Div ULS and Mod ULS and in TABLE 4 to "Mod4", "Div4", "case 0" through "case 3" entries of "switch" statements, and the number of sequential pixels drawn in each of the case statements result from this choice of ULS 4.

In the embodiment of TABLE 4, for clarity no clipping occurs, but, of course, the same long-line and medium-line algorithms can be used for the middle sections of clipped lines with the same performance advantages for non-clipped lines, but for clipped lines care must be taken for clipped endpoints.

TABLE 4

Copyright 1991 Network Computing Devices, Inc.

```
1    #define SHORT_LENGTH           2
2    #define SHORT_LENGTH_LOG2      2
3    #define MEDIUM_LENGTH         20
4
5    /**************
6        This macro is used whenever a pixel is drawn.  The example
7        below simply stores the color specified into the pixel (a
8        raster op of 'copy source').  This macro can be replaced to
9        perform other raster operations.
10   **************/
11   #define draw_pixel(p, color) *p = color;
12
13   DrawSolidLine8(pixmap, bytesPerRow, color, x1, y1, x2, y2)
14   unsigned char *pixmap; /* pointer to pixmap to draw line into */
15   int bytesPerRow;       /** distance in bytes between rows of
16                              pixels in pixmap **/
17   int color;             /* color of pixels in line */
18   int x1, y1;            /* start coordinate of line */
19   int x2, y2;            /* end coordinate of line */
20   {
21       unsigned char *p;
22       int nextA, nextAB, nextRow, nextCol;
23       int da, db, dx, dy;
24       int n, nMidSegments;
25       int nEndPixels, nMidPixels, nMidPixelsDiv4, nMidPixelsMod4;
26       int e, errAdjust, errA, errAB, errExtraPixel, errEndSegment,
27           errMidSegment;
28
29       /************
30           Compute the pixmap address of the start point.
31       ************/
32
```

TABLE 4

Copyright 1991 Network Computing Devices, Inc.

```
33      p = pixmap + x1 + y1 * bytesPerRow;
34
35        if (y2 > y1)
36          nextRow = bytesPerRow;
37        else
38          nextRow = -bytesPerRow;
39
40        if (x2 > x1)
41          nextCol = 1;
42        else
43          nextCol = -1;
44
45        dx = abs(x2 - x1);
46        dy = abs(y2 - y1);
47
48      if (dx <= SHORT_LENGTH && dy <= SHORT_LENGTH)
49        {
50          switch ((dx << SHORT_LENGTH_LOG2) + dy)
51          {
52              case 0:              /* dx = 0, dy = 0 */
53                  draw_pixel(p, color);
54                  break;
55              case 4:              /* dx = 1, dy = 0 */
56                  draw_pixel(p, color);
57                  p += nextCol;
58                  draw_pixel(p, color);
59                  break;
60              case 8:              /* dx = 2, dy = 0 */
61                  draw_pixel(p, color);
62                  p += nextCol;
63                  draw_pixel(p, color);
64                  p += nextCol;
```

TABLE 4

Copyright 1991 Network Computing Devices, Inc.

```
65              draw_pixel(p, color);
66              break;
67          case 1:              /* dx = 0, dy = 1 */
68              draw_pixel(p, color);
69              p += nextRow;
70              draw_pixel(p, color);
71              break;
72          case 5:              /* dx = 1, dy = 1 */
73              draw_pixel(p, color);
74              p += nextCol;
75              p += nextRow;
76              draw_pixel(p, color);
77              break;
78          case 9:              /* dx = 2, dy = 1 */
79              draw_pixel(p, color);
80              p += nextCol;
81              p += nextRow;
82              draw_pixel(p, color);
83              p += nextCol;
84              draw_pixel(p, color);
85              break;
86          case 2:              /* dx = 0, dy = 2 */
87              draw_pixel(p, color);
88              p += nextRow;
89              draw_pixel(p, color);
90              p += nextRow;
91              draw_pixel(p, color);
92              break;
93          case 6:              /* dx = 1, dy = 2 */
94              draw_pixel(p, color);
95              p += nextCol;
96              p += nextRow;
```

TABLE 4

Copyright 1991 Network Computing Devices, Inc.

```
97              draw_pixel(p, color);
98              p += nextRow;
99              draw_pixel(p, color);
100             break;
101         case 10:            /* dx = 2, dy = 2 */
102             draw_pixel(p, color);
103             p += nextCol;
104             p += nextRow;
105             draw_pixel(p, color);
106             p += nextCol;
107             p += nextRow;
108             draw_pixel(p, color);
109             break;
110         }
111     }
112     else if (dx == 0)
113     {
114 /**************
115     Draw a vertical line with any well-known vertical-line
116     algorithm
117 **************/
118     Vertical Line Algorithm
119     }
120     else if (dy == 0)
121     {
122 /**************
123     Draw a horizontal line with any well-known horizontal-line
124     algorithm
125 **************/
126     Horizontal Line Algorithm
127     }
128     else if (dx == dy)
```

TABLE 4

Copyright 1991 Network Computing Devices, Inc.

```
129         {
130     /*************
131         Draw a diagonal line with any well-known diagonal-line
132         algorithm
133     *************/
134         Diagonal Line Algorithm
135         }
136         else
137         {
138     /*************
139         The line was not short, horizontal, vertical, or diagonal.
140         Determine the principal direction of the line and initialize
141         parameters for medium-line or long-line algorithm.
142     *************/
143
144         if (dx < dy)
145         {
146             da = dy;
147             if (dy > 2*dx)
148             {
149               db = dx;
150               nextA = nextRow;
151               nextAB = nextRow + nextCol;
152               if (x2 > x1)
153                   errAdjust = 0;
154               else
155                   errAdjust = -1;
156             }
157             else
158             {
159               db = dy - dx;
160               nextA = nextRow + nextCol;
```

TABLE 4

Copyright 1991 Network Computing Devices, Inc.

```
161            nextAB = nextRow;
162            if (x2 > x1)
163                errAdjust = -1;
164            else
165                errAdjust = 0;
166        }
167    }
168    else /* dx>dy (dx == dy handled by diagonal line code) */
169    {
170        da = dx;
171        if (dx > 2*dy)
172        {
173          db = dy;
174          nextA = nextCol;
175          nextAB = nextRow + nextCol;
176          if (x2 > x1)
177              errAdjust = 0;
178          else
179              errAdjust = -1;
180        }
181        else
182        {
183          db = dx - dy;
184          nextA = nextRow + nextCol;
185          nextAB = nextCol;
186          if (x2 > x1)
187              errAdjust = -1;
188          else
189              errAdjust = 0;
190        }
191    }
192  /**************
```

TABLE 4

Copyright 1991 Network Computing Devices, Inc.

```
193         The number of middle horizontal, vertical, or diagonal
194         segments is easy to compute.
195     *************/
196         nMidSegments = db - 1;
197
198         if (da < MEDIUM_LENGTH)
199         {
200     /*************
201         Medium length lines are drawn in three parts: beginning,
202         middle, and end.
203     *************/
204
205             errA = 2 * db;
206             errAB = 2 * (da - db);
207             errEndSegment = da - errAdjust - 1;
208             e = da + errAdjust;
209
210     /*************
211         Draw the beginning segment of the line.
212     *************/
213             draw_pixel(p, color)
214             while ((e -= errA) >= 0)
215             {
216               p += nextA;
217               draw_pixel(p, color)
218             }
219             p += nextAB;
220     /*************
221         Draw all middle segments of the line.
222     *************/
223
224             while (nMidSegments--)
```

TABLE 4

Copyright 1991 Network Computing Devices, Inc.

```
225              {
226                  e += errAB;
227                  draw_pixel(p, color)
228                  do
229                  {
230                      p += nextA;
231                      draw_pixel(p, color)
232                  }
233                  while ((e -= errA) >= 0);
234                  p += nextAB;
235              }
236
237      /*************
238          Draw the end segment of the line.
239      *************/
240
241              do
242              {
243                draw_pixel(p, color)
244                p += nextA;
245              }
246              while ((errEndSegment -= errA) >= 0);
247          }
248          else  /* line long enough to warrant long line algorithm */
249          {
250      /*************
251          Long line algorithm draws long lines by breaking them up
252          into  horizontal,  vertical,  or  diagonal  segments  as
253          determined by the values of nextA, nextAB, da and db.
254      *************/
255      /*************
256          Initialize variables for drawing the beginning segment.
```

TABLE 4

Copyright 1991 Network Computing Devices, Inc.

```
257    *************/
258            errExtraPixel = 2 * db;  /* error term for one pixel */
259            errEndSegment = da;      /* accumulates errEndSegment */
260            nEndPixels = 0;          /* accumulates nMidPixels */
261    /*************
262        Loop to draw unconditional pixels in the beginning segment.
263    *************/
264            while ((errEndSegment -= errExtraPixel) >= 0)
265            {
266              nEndPixels++;
267              draw_pixel(p, color)
268              p += nextA;
269            }
270    /*************
271        The last loop did one too many subtracts, so undo this.
272    *************/
273
274            errEndSegment += errExtraPixel;
275
276    /*************
277        The number of pixels and error term for each middle segment,
278        with the exception of a possible odd pixel considered below,
279        is exactly twice that of the end segment.
280    *************/
281            nMidPixels = 2 * nEndPixels;
282            errMidSegment = 2 * errEndSegment;
283
284    /*************
285        Now determine whether the odd pixel should be drawn for the
286        middle segments.
287    *************/
288            if (errMidSegment >= errExtraPixel)
```

TABLE 4

Copyright 1991 Network Computing Devices, Inc.

```
289            {
290              nMidPixels++;
291              errMidSegment -= errExtraPixel;
292            }
293    /*************
294        nMidPixelsDiv4 is reduced by one to make the inner loops for
295        the middle segments more efficient.  This enables the inner
296        loops to use a 'do while' construct instead of 'while',
297        which saves a conditional branch instruction.
298    *************/
299            nMidPixelsDiv4 = (nMidPixels >> 2) - 1;
300            nMidPixelsMod4 = nMidPixels & 3;
301
302    /*************
303        Initialize error term for middle segments.
304    *************/
305            e = errEndSegment + errAdjust;
306
307    /*************
308        Adjust the error term for the end segment.  errAdjust causes
309        the vectors to be reversible (the same pixels are chosen for
310        the vector regardless of the ordering of the endpoints).
311    *************/
312            errEndSegment -= errAdjust;
313    /*************
314        Draw the conditional pixel in the beginning segment, if
315        necessary.
316    *************/
317            if (e >= 0)
318            {
319              draw_pixel(p, color)
320              p += nextA;
```

TABLE 4

Copyright 1991 Network Computing Devices, Inc.

```
321             e -= errExtraPixel;
322         }
323 /**************
324     Move pointer to first pixel of first middle segment.
325 **************/
326         p += nextAB - nextA;
327
328 /**************
329     Each middle segment is drawn in two or three parts,
330     depending on the size. If nMidPixels is small enough to
331     fall into one of the special case loops:
332             1. The conditional pixel is drawn, if necessary.
333             2. nMidPixels pixels are drawn.
334     Otherwise:
335             1. The conditional pixel is drawn, if necessary.
336             2. (nMidPixels mod 4) pixels are drawn.
337             3. (nMidPixels div 4) groups of four pixels are
338                drawn.
339     Determine which of the middle segment loops should be used
340     based on nMidPixels (the length of each middle segment).
341 **************/
342         if (nMidPixels <= 5)
343         {
344         switch (nMidPixels)
345         {
346         case 2:
347             {
348 /**************
349     Draw 2 or 3 pixels per segment.
350 **************/
351                 while (nMidSegments--)
352                 {
```

TABLE 4

Copyright 1991 Network Computing Devices, Inc.

```
353                     if ((e += errMidSegment) >= 0)
354                     {
355                      draw_pixel(p, color)
356                      p += nextA;
357                      e -= errExtraPixel;
358                     }
359                     draw_pixel(p, color)
360                     p += nextA;
361                     draw_pixel(p, color)
362                     p += nextAB;
363                 }
364             }
365         break;
366
367         case 3:
368             {
369 /*************
370     Draw 3 or 4 pixels per segment.
371 *************/
372             while (nMidSegments--)
373             {
374                 if ((e += errMidSegment) >= 0)
375                 {
376                  draw_pixel(p, color)
377                  p += nextA;
378                  e -= errExtraPixel;
379                 }
380                 draw_pixel(p, color)
381                 p += nextA;
382                 draw_pixel(p, color)
383                 p += nextA;
384                 draw_pixel(p, color)
```

TABLE 4

Copyright 1991 Network Computing Devices, Inc.

```
385                    p += nextAB;
386                  }
387                }
388              break;
389
390          case 4:
391            {
392  /*************
393      Draw 4 or 5 pixels per segment.
394  *************/
395                while (nMidSegments--)
396                {
397                    if ((e += errMidSegment) >= 0)
398                    {
399                      draw_pixel(p, color)
400                      p += nextA;
401                      e -= errExtraPixel;
402                    }
403                    draw_pixel(p, color)
404                    p += nextA;
405                    draw_pixel(p, color)
406                    p += nextA;
407                    draw_pixel(p, color)
408                    p += nextA;
409                    draw_pixel(p, color)
410                    p += nextAB;
411                }
412            }
413            break;
414
415          case 5:
416            {
```

TABLE 4

Copyright 1991 Network Computing Devices, Inc.

```
417   /*************
418        Draw 5 or 6 pixels per segment.
419   *************/
420              while (nMidSegments--)
421              {
422                  if ((e += errMidSegment) >= 0)
423                  {
424                   draw_pixel(p, color)
425                   p += nextA;
426                   e -= errExtraPixel;
427                  }
428                  draw_pixel(p, color)
429                  p += nextA;
430                  draw_pixel(p, color)
431                  p += nextA;
432                  draw_pixel(p, color)
433                  p += nextA;
434                  draw_pixel(p, color)
435                  p += nextA;
436                  draw_pixel(p, color)
437                  p += nextAB;
438              }
439              }
440          break;
441      }
442      }
443      else
444      {
445       switch (nMidPixelsMod4)
446       {
447       case 0:
448          {
```

TABLE 4

Copyright 1991 Network Computing Devices, Inc.

```
449     /**************
450         Draw 4n + 0 pixels per segment.
451     **************/
452                 nextAB -= nextA;
453                 while (nMidSegments--)
454                 {
455                     if ((e += errMidSegment) >= 0)
456                     {
457                         draw_pixel(p, color)
458                         p += nextA;
459                         e -= errExtraPixel;
460                     }
461                     n = nMidPixelsDiv4;
462                     do
463                     {
464                         draw_pixel(p, color)
465                         p += nextA;
466                         draw_pixel(p, color)
467                         p += nextA;
468                         draw_pixel(p, color)
469                         p += nextA;
470                         draw_pixel(p, color)
471                         p += nextA;
472                     }
473                     while (n--);
474                     p += nextAB;
475                 }
476             }
477             break;
478
479         case 1:
480             {
```

TABLE 4

Copyright 1991 Network Computing Devices, Inc.

```
481     /**************
482             Draw 4n + 1 pixels per segment.
483     **************/
484                     while (nMidSegments--)
485                     {
486                         if ((e += errMidSegment) >= 0)
487                         {
488                           draw_pixel(p, color)
489                           p += nextA;
490                           e -= errExtraPixel;
491                         }
492                         n = nMidPixelsDiv4;
493                         do
494                         {
495                           draw_pixel(p, color)
496                           p += nextA;
497                           draw_pixel(p, color)
498                           p += nextA;
499                           draw_pixel(p, color)
500                           p += nextA;
501                           draw_pixel(p, color)
502                           p += nextA;
503                         }
504                         while (n--);
505                         draw_pixel(p, color)
506                         p += nextAB;
507                     }
508                 }
509             break;
510
511         case 2:
512             {
```

TABLE 4

Copyright 1991 Network Computing Devices, Inc.

```
513     /**************
514         Draw 4n + 2 pixels per segment.
515     **************/
516                 while (nMidSegments--)
517                 {
518                     if ((e += errMidSegment) >= 0)
519                     {
520                       draw_pixel(p, color)
521                       p += nextA;
522                       e -= errExtraPixel;
523                     }
524                     n = nMidPixelsDiv4;
525                     do
526                     {
527                       draw_pixel(p, color)
528                       p += nextA;
529                       draw_pixel(p, color)
530                       p += nextA;
531                       draw_pixel(p, color)
532                       p += nextA;
533                       draw_pixel(p, color)
534                       p += nextA;
535                     }
536                     while (n--);
537                     draw_pixel(p, color)
538                     p += nextA;
539                     draw_pixel(p, color)
540                     p += nextAB;
541                 }
542             }
543         break;
544
```

TABLE 4

Copyright 1991 Network Computing Devices, Inc.

```
545                case 3:
546                    {
547    /**************
548        Draw 4n + 3 pixels per segment.
549    **************/
550                    while (nMidSegments--)
551                    {
552                        if ((e += errMidSegment) >= 0)
553                        {
554                          draw_pixel(p, color)
555                          p += nextA;
556                          e -= errExtraPixel;
557                        }
558                        n = nMidPixelsDiv4;
559                        do
560                        {
561                          draw_pixel(p, color)
562                          p += nextA;
563                          draw_pixel(p, color)
564                          p += nextA;
565                          draw_pixel(p, color)
566                          p += nextA;
567                          draw_pixel(p, color)
568                          p += nextA;
569                        }
570                        while (n--);
571                        draw_pixel(p, color)
572                        p += nextA;
573                        draw_pixel(p, color)
574                        p += nextA;
575                        draw_pixel(p, color)
576                        p += nextAB;
```

TABLE 4

Copyright 1991 Network Computing Devices, Inc.

```
577                    }
578                  }
579               break;
580            }
581          }
582
583    /**************
584        Draw unconditional pixels of the end segment.
585    **************/
586            while (nEndPixels--)
587            {
588              draw_pixel(p, color)
589              p += nextA;
590            }
591
592    /**************
593        Draw the conditional pixel of the end segment.
594    **************/
595            if (errEndSegment > 0)
596            {
597              draw_pixel(p, color)
598              p += nextA;
599            }
600        }
601      }
602    }
```

In TABLE 5, a trace of the execution of the program of TABLE 4 is shown when the medium-length line of FIG. 4 is drawn from XY coordinates (1,1) to (16,7) using the medium-length line algorithm.

TABLE 5

```
1
2   (2) trace DrawSolidLine8
3   (3) trace
4   (4) trace pixmap
5   (5) trace bytesPerRow
6   (6) trace color
7   (7) trace 'thinlines'line'x1
8   (8) trace 'thinlines'line'y1
9   (9) trace 'thinlines'line'x2
10  (10) trace 'thinlines'line'y2
11  (11) trace p
12  (12) trace nextA
13  (13) trace nextAB
14  (14) trace nextRow
15  (15) trace nextCol
16  (16) trace da
17  (17) trace db
18  (18) trace dx
19  (19) trace dy
20  (20) trace n
21  (21) trace nMidSegments
22  (22) trace nEndPixels
23  (23) trace nMidPixels
24  (24) trace nMidPixelsDiv4
25  (25) trace nMidPixelsMod4
26  (26) trace 'e
27  (27) trace errAdjust
28  (28) trace errA
29  (29) trace errAB
30  (30) trace errExtraPixel
31  (31) trace errEndSegment
32  (32) trace errMidSegment
33  Running: thinlines 1
34  calling DrawSolidLine8(pixmap = 0x411e,
    bytesPerRow = 1, color
35  = 1, x1 = 16, y1 = 7, x2 = 1, y2 = 0) from function line
36
37  initially (at line 33):   pixmap = 0x41c0
38  initially (at line 33):   bytesPerRow = 32
39  initially (at line 33):   color = 1
40  initially (at line 33):   'thinlines'line'x1 = 1
41  initially (at line 33):   'thinlines'line'y1 = 1
42  initially (at line 33):   'thinlines'line'x2 = 16
43  initially (at line 33):   'thinlines'line'y2 = 7
44  initially (at line 33):   p = 0xff2b0000
45  initially (at line 33):   nextA = −142954164
46  initially (at line 33):   nextAB = −142954168
47  initially (at line 33):   nextRow = 289407105
48  initially (at line 33):   nextCol = 0
49  initially (at line 33):   da = 0
50  initially (at line 33):   db = 0
51  initially (at line 33):   dx = 0
52  initially (at line 33):   dy = 0
53  initially (at line 33):   n = 0
54  initially (at line 33):   nMidSegments = −142647208
55  initially (at line 33):   nEndPixels = −134219936
56  initially (at line 33):   nMidPixels = 8191
57  initially (at line 33):   nMidPixelsDiv4 = 3
58  initially (at line 33):   nMidPixelsMod4 = −134219716
59  initially (at line 33):   'e = 0x20010203
60  initially (at line 33):   errAdjust = −8192
61  initially (at line 33):   errA = 0
62  initially (at line 33):   errAB = −142614436
63  initially (at line 33):   errExtraPixel = −107114496
64  initially (at line 33):   errEndSegment = 1073743283
65  initially (at line 33):   errMidSegment = −142611408
66  trace:       33  p = pixmap + x1 + y1 * bytesPerRow;
67  after line 33 p = 0x41e1
68  trace:       35  if (y2 > y1)
69  trace:       36  nextRow = bytesPerRow;
70  after line 36 nextRow = 32
71  trace:       40  if (x2 > x1)
72  trace:       41  nextCol = 1;
```

TABLE 5-continued

```
73  after line 41 nextCol = 1
74  trace:       45  dx = abs(x2 − x1);
75  after line 45 dx = 15
76  trace:       46  dy = abs(y2 − y1);
77  after line 46 dy = 6
78  trace:       48  if (dx <= SHORT_LENGTH &&
                     dy <= SHORT_LENGTH)
79  trace:      112  else if (dx = = 0)
80  trace:      120  else if (dy = = 0)
81  trace:      128  else if (dx = = dy)
82  trace:      144  if (dx < dy)
83  trace:      170  da = dx;
84  after line 170 da = 15
85  trace:      171  if (dx > 2*dy)
86  trace:      173  db = dy;
87  after line 173 db = 6
88  trace:      174  nextA = nextCol;
89  after line 174 nextA = 1
90  trace:      175  nextAB = nextRow + nextCol;
91  after line 175 nextAB = 33
92  trace:      176  if (x2 > x1)
93  trace:      177  errAdjust = 0;
94  after line 177 errAdjust = 0
95  trace:      196  nMidSegments = db − 1;
96  after line 196 nMidSegments = 5
97  trace:      198  if (da < MEDIUM_LENGTH)
98  trace:      205  errA = 2 * db;
99  after line 205 errA = 12
100 trace:      206  errAB = 2 * (da − db);
101 after line 206 errAB = 18
102 trace:      207  errEndSegment = da − errAdjust − 1;
103 after line 207 errEndSegment = 14
104 trace:      208  e = da + errAdjust;
105 trace:      213  draw_pixel(p, color)
106 trace:      214  while ((e −= errA) >= 0)
107 trace:      216  p += nextA;
108 after line 216 p = 0x41e2
109 trace:      217  draw_pixel(p, color)
110 trace:      214  while ((e −= errA) >= 0)
111 trace:      219  p += nextAB;
112 after line 219 p = 0x4203
113 trace:      224  while (nMidSegments− −)
114 after line 224 nMidSegments = 4
115 trace:      226  e += errAB;
116 trace:      227  draw_pixel(p, color)
117 trace:      230  p += nextA;
118 after line 230 p = 0x4204
119 trace:      231  draw_pixel(p, color)
120 trace:      233  while ((e −= errA) >= 0);
121 trace:      234  p += nextAB;
122 after line 234 p = 0x4225
123 trace:      224  while (nMidSegments− −)
124 after line 224 nMidSegments = 3
125 trace:      226  e += errAB;
126 trace:      227  draw_pixel(p, color)
127 trace:      230  p += nextA;
128 after line 230 p = 0x4226
129 trace:      231  draw_pixel(p, color)
130 trace:      233  while ((e −= errA) >= 0);
131 trace:      234  p += nextAB;
132 after line 230 p = 0x4227
133 trace:      231  draw_pixel(p, color)
134 trace:      233  while ((e −= errA) >= 0);
135 trace:      234  p += nextAB;
136 after line 234 p = 0x4248
137 trace:      224  while (nMidSegments− −)
138 after line 224 nMidSegments = 2
139 trace:      226  e += errAB;
140 trace:      227  draw_pixel(p, color)
141 trace:      230  p += nextA;
142 after line 230 p = 0x4249
143 trace:      231  draw_pixel(p, color)
144 trace:      233  while ((e −= errA) >= 0);
145 trace:      234  p += nextAB;
146 after line 234 p = 0x426a
147 trace:      224  while (nMidSegments− −)
148 after line 224 nMidSegments = 1
149 trace:      226  e += errAB;
```

TABLE 5-continued

```
150  trace:       227  draw_pixel(p, color)
151  trace:       230  p += nextA;
152  after line 230 p = 0x426b
153  trace:       231  draw_pixel(p, color)
154  trace:       233  while ((e -= errA) >= 0);
155  trace:       230  p += nextA;
156  after line 230 p = 0x426c
157  trace:       231  draw_pixel(p, color)
158  trace:       233  while ((e -= errA) >= 0);
159  trace:       234  p += nextAB;
160  after line 234 p = 0x428d
161  trace:       224  while (nMidSegments--)
162  after line 224 nMidSegments = 0
163  trace:       226  e += errAB;
164  trace:       227  draw_pixel(p, color)
165  trace:       230  p += nextA;
166  after line 230 p = 0x428e
167  trace:       231  draw_pixel(p, color)
168  trace:       233  while ((e -= errA) >= 0);
169  trace:       234  p += nextAB;
170  after line 234 p = 0x42af
171  trace:       224  while (nMidSegments--)
172  after line 224 nMidSegments = -1
173  trace:       243  draw_pixel(p, color)
174  trace:       244  p += nextA;
175  after line 244 p = 0x42b0
176  trace:       246  while ((errEndSegment -= errA) >= 0);
177  after line 246 errEndSegment = 2
178  trace:       243  draw_pixel(p, color)
179  trace:       244  p += nextA;
180  after line 244 p = 0x42b1
181  trace:       246  while ((errEndSegment -= errA) >= 0);
182  after line 246 errEndSegment = -10
183  returning 0 from DrawSolidLine8
```

Figure 7:
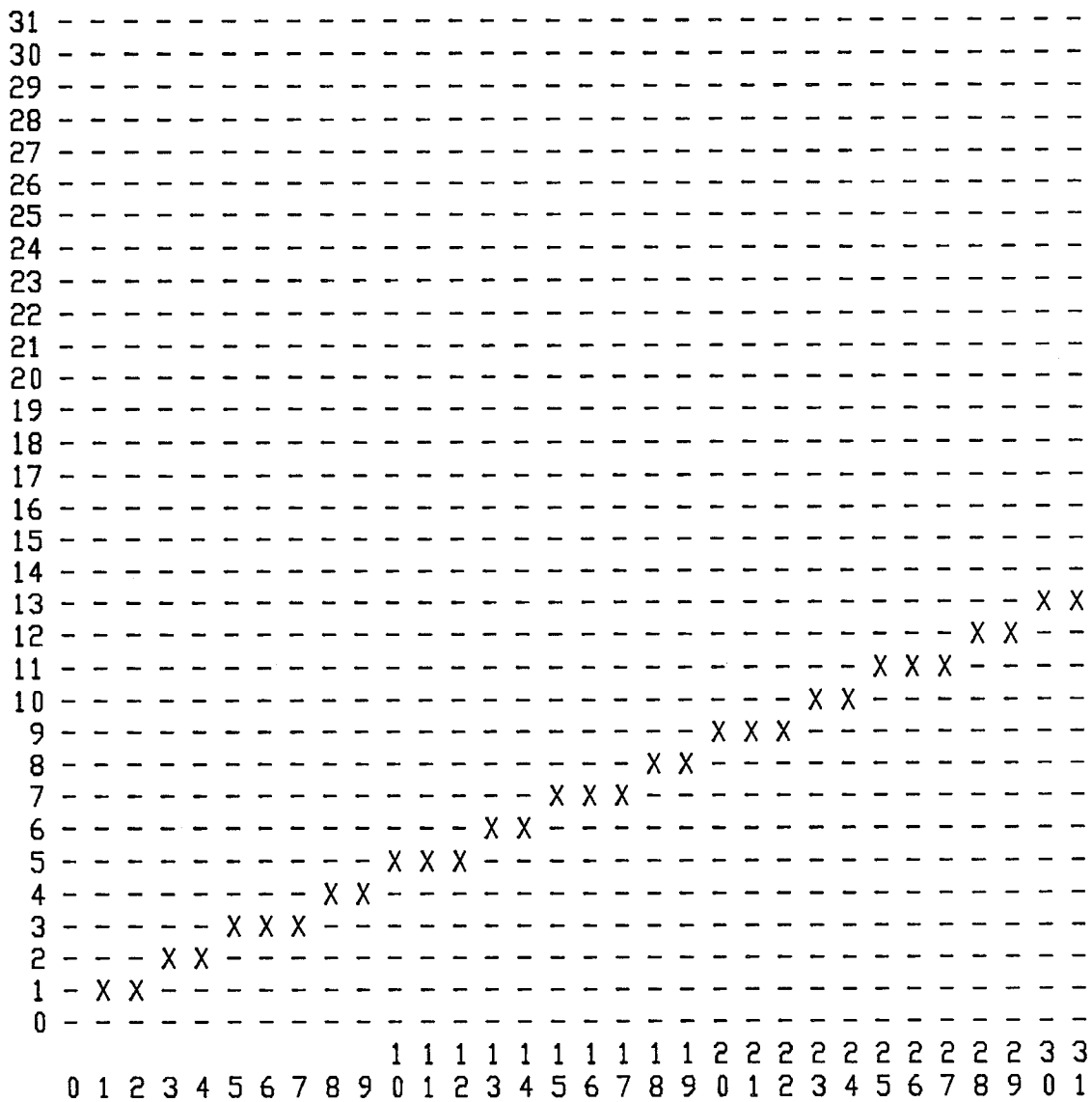
FIG. 7 depicts a long-length line drawn from coordinates ( 1,1 ) to coordinates (31,13) where the X-axis is the Major Axis.
Figure 8:
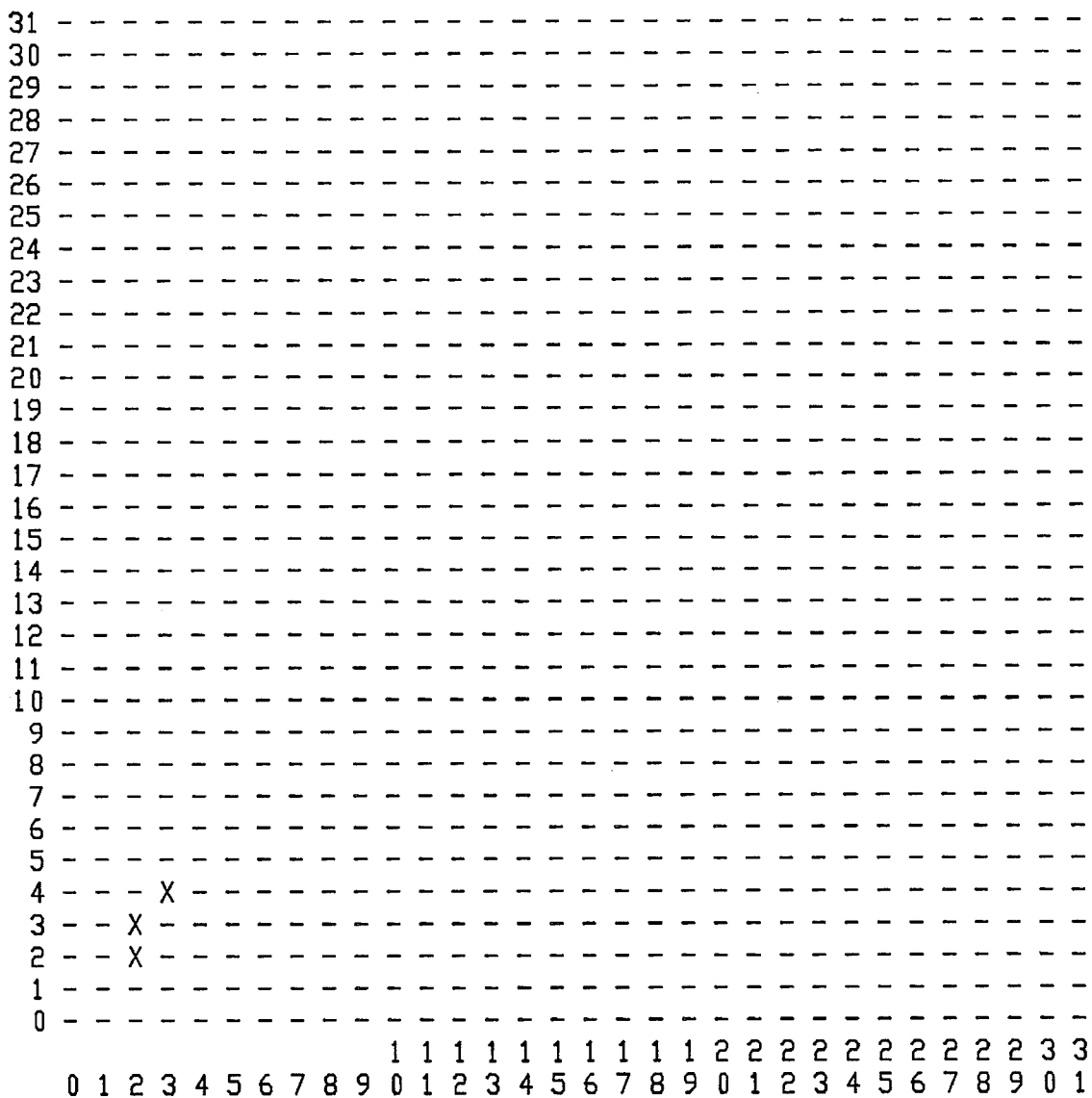
FIG. 8 depicts a short-length line drawn from coordinates (2,2) to coordinates (3,5).

In TABLE 6, a trace of the execution of the program of TABLE 4 is shown when the long-length line of FIG. 7 is drawn from XY coordinates (1,1) to (31,13) using the long-length line algorithm.

TABLE 6

```
1
2    (2) trace DrawSolidLine8
3    (3) trace
4    (4) trace pixmap
5    (5) trace bytesPerRow
6    (6) trace color
7    (7) trace 'thinlines'line'x1
8    (8) trace 'thinlines'line'y1
9    (9) trace 'thinlines'line'x2
10   (10) trace 'thinlines'line'y2
11   (11) trace p
12   (12) trace nextA
13   (13) trace nextAB
14   (14) trace nextRow
15   (15) trace nextCol
16   (16) trace da
17   (17) trace db
18   (18) trace dx
19   (19) trace dy
20   (20) trace n
21   (21) trace nMidSegments
22   (22) trace nEndPixels
23   (23) trace nMidPixels
24   (24) trace nMidPixelsDiv4
25   (25) trace nMidPixelsMod4
26   (26) trace 'e
27   (27) trace errAdjust
28   (28) trace errA
29   (29) trace errAB
30   (30) trace errExtraPixel
31   (31) trace errEndSegment
32   (32) trace errMidSegment
33   Running: thinlines 5
34   calling  DrawSolidLine8(pixmap = 0x4186,
35            bytesPerRow = 1, color = 1, x1 = 31, y1 = 13,
36            x2 = 1, y2 = 0) from function line
37
38   initially (at line 33):    pixmap = 0x41c0
39   initially (at line 33):    bytesPerRow = 32
40   initially (at line 33):    color = 1
41   initially (at line 33):    'thinlines'line'x1 = 1
42   initially (at line 33):    'thinlines'line'y1 = 1
43   initially (at line 33):    'thinlines'line'x2 = 31
44   initially (at line 33):    'thinlines'line'y2 = 13
45   initially (at line 33):    p = 0xff2b0000
46   initially (at line 33):    nextA = -142954164
47   initially (at line 33):    nextAB = -142954168
48   initially (at line 33):    nextRow = 289407107
49   initially (at line 33):    nextCol = 0
50   initially (at line 33):    da = 0
51   initially (at line 33):    db = 0
52   initially (at line 33):    dx = 0
53   initially (at line 33):    dy = 0
54   initially (at line 33):    n = 0
55   initially (at line 33):    nMidSegments = -142647208
56   initially (at line 33):    nEndPixels = -134219936
57   initially (at line 33):    nMidPixels = 8191
58   initially (at line 33):    nMidPixelsDiv4 = 3
59   initially (at line 33):    nMidPixelsMod4 = -134219716
60   initially (at line 33):    'e = 0x20010203
61   initially (at line 33):    errAdjust = -8192
62   initially (at line 33):    errA = 0
63   initially (at line 33):    errAB = -142614436
64   initially (at line 33):    errExtraPixel = -107114496
65   initially (at line 33):    errEndSegment = 1073743283
66   initially (at line 33):    errMidSegment = -142611408
67   trace:       33  p = pixmap + x1 + y1 * bytesPerRow;
68   after line 33 p = 0x41e1
69   trace:       35  if (y2 > y1)
70   trace:       36  nextRow = bytesPerRow;
71   after line 36 nextRow = 32
72   trace:       40  if (x2 > x1)
73   trace:       41  nextCol = 1;
74   after line 41 nextCol = 1
75   trace:       45  dx = abs(x2 - x1);
76   after line 45 dx = 30
77   trace:       46  dy = abs(y2 - y1);
78   after line 46 dy = 12
79   trace:       48  if (dx <= SHORT_LENGTH &&
                           dy <= SHORT_LENGTH)
80   trace:       112 else if (dx == 0)
81   trace:       120 else if (dy == 0)
82   trace:       128 else if (dx == dy)
83   trace:       144 if (dx < dy)
84   trace:       170 da = dx;
85   after line 170 da = 30
86   trace:       171 if (dx > 2*dy)
87   trace:       173 db = dy;
88   after line 173 db = 12
89   trace:       174 nextA = nextCol;
90   after line 174 nextA = 1
91   trace:       175 nextAB = nextRow + nextCol;
92   after line 175 nextAB = 33
93   trace:       176 if (x2 > x1)
94   trace:       177 errAdjust = 0;
95   after line 177 errAdjust = 0
96   trace:       196 nMidSegments = db - 1;
97   after line 196 nMidSegments = 11
98   trace:       198 if (da < MEDIUM_LENGTH)
99   trace:       258 errExtraPixel = 2*db;  /* error term for
                           one pixel */
100  after line 258 errExtraPixel = 24
101  trace:       259 errEndSegment = da;
                       /* accumulate errEndSegment */
102  after line 259 errEndSegment = 30
103  trace:       260 nEndPixels = 0;
                       /* accumulates nMidPixels */
104  after line 260 nEndPixels = 0
105  trace:       264 while ((errEndSegment -=
                           errExtraPixel) >= 0)
106  after line 264 errEndSegment = 6
107  trace:       266 nEndPixels++;
108  after line 266 nEndPixels = 1
109  trace:       267 draw_pixel(p, color)
```

TABLE 6-continued

```
110 trace:      268  p += nextA;
111 after line 268 p = 0x41e2
112 trace:      264  while ((errEndSegment -=
                     errExtraPixel) >= 0)
113 after line 264 errEndSegment = -18
114 trace:      274  errEndSegment += errExtraPixel;
115 after line 274 errEndSegment = 6
116 trace:      281  nMidPixels = 2 * nEndPixels;
117 after line 281 nMidPixels = 2
118 trace:      282  errMidSegment = 2 * errEndSegment;
119 after line 282 errMidSegment = 12
120 trace:      288  if (errMidSegment >= errExtraPixel)
121 trace:      299  nMidPixelsDiv4 = (nMidPixels >>
                     2) − 1;
122 after line 299 nMidPixelsDiv4 = -1
123 trace:      300  nMidPixelsMod4 = nMidPixels & 3;
124 after line 300 nMidPixelsMod4 = 2
125 trace:      305  e = errEndSegment + errAdjust;
126 trace:      312  errEndSegment -= errAdjust;
127 trace:      317  if (e >= 0)
128 trace:      319  draw_pixel(p, color)
129 trace:      320  p += nextA;
130 after line 320 p = 0x41e3
131 trace:      321  e -= errExtraPixel;
132 trace:      326  p += nextAB − nextA;
133 after line 326 p = 0x4203
134 trace:      342  if (nMidPixels <= 5)
135 trace:      344  switch (nMidPixels)
136 trace:      344  switch (nMidPixels)
137 trace:      351  while (nMidSegments− −)
138 after line 351 nMidSegments = 10
139 trace:      353  if ((e += errMidSegment) >= 0)
140 trace:      359  draw_pixel(p, color)
141 trace:      360  p += nextA;
142 after line 360 p = 0x4204
143 trace:      361  draw_pixel(p, color)
144 trace:      362  p += nextAB;
145 after line 362 p = 0x4225
146 trace:      351  while (nMidSegments− −)
147 after line 351 nMidSegments = 9
148 trace:      353  if ((e += errMidSegment) >= 0)
149 trace:      355  draw_pixel(p, color)
150 trace:      356  p += nextA;
151 after line 356 p = 0x4226
152 trace:      357  e -= errExtraPixel;
153 trace:      359  draw_pixel(p, color)
154 trace:      360  p += nextA;
155 after line 360 p = 0x4227
156 trace:      361  draw_pixel(p, color)
157 trace:      362  p += nextAB;
158 after line 362 p = 0x4248
159 trace:      351  while (nMidSegments− −)
160 after line 351 nMidSegments = 8
161 trace:      353  if ((e += errMidSegment) >= 0)
162 trace:      359  draw_pixel(p, color)
163 trace:      360  p += nextA;
164 after line 360 p = 0x4249
165 trace:      361  draw_pixel(p, color)
166 trace:      362  p += nextAB;
167 after line 362 p = 0x426a
168 trace:      351  while (nMidSegments− −)
169 after line 351 nMidSegments = 7
170 trace:      353  if ((e += errMidSegment) >= 0)
171 trace:      355  draw_pixel(p, color)
172 trace:      356  p += nextA;
173 after line 356 p = 0x426b
174 trace:      357  e -= errExtraPixel;
175 trace:      359  draw_pixel(p, color)
176 trace:      360  p += nextA;
177 after line 360 p = 0x426c
178 trace:      361  draw_pixel(p, color)
179 trace:      362  p += nextAB;
180 after line 362 p = 0x428d
181 trace:      351  while (nMidSegments− −)
182 after line 351 nMidSegments = 6
183 trace:      353  if ((e += errMidSegment) >= 0)
184 trace:      359  draw_pixel(p, color)
185 trace:      360  p += nextA;
186 after line 360 p = 0x428e
187 trace:      361  draw_pixel(p, color)
188 trace:      362  p += nextAB;
189 after line 362 p = 0x42af
190 trace:      351  while (nMidSegments− −)
191 after line 351 nMidSegments = 5
192 trace:      353  if ((e += errMidSegment) >= 0)
193 trace:      355  draw_pixel(p, color)
194 trace:      356  p += nextA;
195 after line 356 p = 0x42b0
196 trace:      357  e -= errExtraPixel;
197 trace:      359  draw_pixel(p, color)
198 trace:      360  p += nextA;
199 after line 360 p = 0x42b1
200 trace:      361  draw_pixel(p, color)
201 trace:      362  p += nextAB;
202 after line 362 p = 0x42d2
203 trace:      351  while (nMidSegments− −)
204 after line 351 nMidSegments = 4
205 trace:      353  if ((e += errMidSegment) >= 0)
206 trace:      359  draw_pixel(p, color)
207 trace:      360  p += nextA;
208 after line 360 p = 0x42d3
209 trace:      361  draw_pixel(p, color)
210 trace:      362  p += nextAB;
211 after line 362 p = 0x42f4
212 trace:      351  while (nMidSegments− −)
213 after line 351 n-MidSegments = 3
214 trace:      353  if ((e += errMidSegment) >= 0)
215 trace:      355  draw_pixel(p, color)
216 trace:      356  p += nextA;
217 after line 356 p = 0x42f5
218 trace:      357  e -= errExtraPixel;
219 trace:      359  draw_pixel(p, color)
220 trace:      360  p += nextA;
221 after line 360 p = 0x42f6
222 trace:      361  draw_pixel(p, color)
223 trace:      362  p += nextAB;
224 after line 362 p = 0x4317
225 trace:      351  while (nMidSegments− −)
226 after line 351 nMidSegments = 2
227 trace:      353  if ((e += errMidSegment) >= 0)
228 trace:      359  draw_pixel(p, color)
229 trace       360  p += nextA;
230 after line 360 p = 0x4318
231 trace:      361  draw_pixel(p, color)
232 trace:      362  p += nextAB;
233 after line 362 p = 0x4339
234 trace:      351  while (nMidSegments− −)
235 after line 351 nMidSegments = 1
236 trace:      353  if ((e += errMidSegment) >= 0)
237 trace:      355  draw_pixel(p, color)
238 trace:      356  p += nextA;
239 after line 356 p = 0x433a
240 trace:      357  e -= errExtraPixel;
241 trace:      359  draw_pixel(p, color)
242 trace:      360  p += nextA;
243 after line 360 p = 0x433b
244 trace:      361  draw_pixel(p, color)
245 trace:      362  p += nextAB;
246 after line 362 p = 0x435c
247 trace:      351  while (nMidSegments− −)
248 after line 351 nMidSegments = 0
249 trace:      353  if ((e += errMidSegment) >= 0)
250 trace:      359  draw_pixel(p, color)
251 trace:      360  p += nextA;
252 after line 360 p = 0x435d
253 trace:      361  draw_pixel(p, color)
254 trace:      362  p += nextAB;
255 after line 362 p = 0x437e
256 trace:      351  while (nMidSegments− −)
257 after line 351 nMidSegments = -1
258 trace:      365  break;
259 trace:      586  while (nEndPixels− −)
260 after line 586 nEndPixels = 0
261 trace:      588  draw_pixel(p, color)
262 trace:      589  p += nextA;
263 after line 589 p = 0x437f
264 trace:      586  while (nEndPixels− −)
265 after line 586 nEndPixels = -1
```

TABLE 6-continued

| | | |
|---|---|---|
| 266 trace: | 595 | if (errEndSegment > 0) |
| 267 trace: | 597 | draw_pixel(p, color) |
| 268 trace: | 598 | p += nextA; |
| 269 after line 598 p = 0x4380 | | |
| 270 returning 0 from DrawSolidLine8 | | |

Performance Analysis Of Line-Draw Methods

This analysis compares the performance of the three following line- draw methods:
1. Bresenham's Method
2. Double Loop Burst Method (medium lines)
3. Single Loop Burst Method (long lines)

For simplicity and clarity, this analysis is restricted to the middle loops of all of three methods ignoring any special code to draw pixels near the beginning and ends of the lines. For long lines, this simplifying assumption is meaningful.

The performance of each of these methods can be characterized by the time it takes to execute three components of the code:

T_—Code to draw the pixel and advance the pixel address.
T_decide —code to manipulate the decision variable.
T_loop —Code to continue or terminate the loop.

Each of the three methods executes these three components of code at different rates per pixel. The equations for each of the three methods can be expressed in terms of the component times for each of these three components resulting in a total time, T_total, per pixel:

$$T\_total = T\_pixel * R\_pixel + T\_decide * R\_decide + T\_Loop * R\_Loop$$

The terms R_pixel, R_decide, and R_loop are the ratios indicating how often each piece of code is executed per pixel. For example, a ratio of 0.5 means that the code is executed once for every two pixels. The following table shows the ratios for each of the three line drawing methods. These ratios are averaged over lines with arbitrary slope and the results are indicated in TABLE 7.

TABLE 7

| | R_pixel | R_decide | R_loop |
|---|---|---|---|
| Bresenham's | 1.00 | 1.00 | 1.00 |
| Double Loop Burst Method | 1.00 | 0.50 | 0.50 |
| Single Loop Burst Method | 1.00 | 0.25 | 0.25 |

The times T_pixel, T_decide, and T_loop can be computed for a given CPU, and are approximately the same for each of the three line drawing methods. The following table shows the times for a Motorola 68020. These times are based on drawing an 8-bit pixel with a byte write operation.

| | T_pixel | T_decide | T_loop |
|---|---|---|---|
| Motorola 68020 | 4 | 10 | 6 |

The approximate execution times per pixel for each of the methods on a Motorola 68020 are

| | T_total |
|---|---|
| Bresenham's Method | 20 |
| Double Loop Burst Method | 12 |
| Single Loop Burst Method | 8 |

The times only represent the inner loop, not the ends or setup, and are only approximate because the times T_pixel, T_decide, and T_loop are not constant for each of the methods. Nevertheless the times are substantially the same and hence this analysis indicates that the multi-pixel segment burst methods of the present invention are far superior to Bresenham's Method.

While the invention has been particularly shown and described with reference to preferred embodiments thereof, it will be understood by those skilled in the art that the foregoing and other changes in form and details may be made therein without departing from the spirit and scope of the invention.

I claim:

1. A line-draw method for drawing a line in a computer system comprising, drawing a plurality of line segments to form the line where each line segment has a segment length SL and includes a number U of pixels and a number A of pixels whereby SL equals U+A and wherein each line segment is drawn by the steps of, drawing U pixels without condition evaluation, determining the number A of pixels to be drawn with condition evaluation, wherein the step of determining the number A of pixels is performed A times, drawing A pixels.

2. A line-draw method for drawing a line in a computer system comprising, drawing a plurality of line segments to form the line where each line segment has a segment length SL and includes a number U of pixels and a number A of pixels whereby SL equals U+A wherein said plurality of segments includes a beginning segment, one or more middle segments and an end segment and wherein each line segment is drawn by the steps of, drawing U pixels without condition evaluation, determining the number A of pixels to be drawn with condition evaluation, drawing A pixels.

3. A line-draw method for drawing a line in a computer system where the line has a direction and a length, where the line is formed by a plurality of line segments and where, in the computer system, one or more segment loops having executable instructions are provided and, for each segment, One of the segment loops is executed to draw the segment, and wherein one or more of said segment loops includes the steps of, drawing a number U Of pixels unconditionally, determining an actual number A of pixels to be drawn as a function of a condition, and wherein said condition in the step of determining an actual number A of pixels to be drawn for each segment is a function of said direction and length and wherein said condition is tested once for each of said number A of pixels to be drawn, drawing A pixels.

4. A line-draw method for drawing a line in a computer system where the line has a direction and a length, where the line is formed by a plurality of line segments and where, in the computer system, one or more segment loops having executable instructions are provided and, for each segment, one of the segment loops is executed to draw the segment, and wherein one or more of said segment loops includes the steps of, drawing a number U of pixels unconditionally, determining an actual number A of pixels to be drawn as a function of a condition, and wherein the step of determining an actual number A of pixels to be drawn is a function of the direction and length, drawing A pixels.

5. A line-draw method for drawing a line in a computer system relative to an axes system with a major axis and an orthogonal minor axis, where the line has a projection da onto the major axis and a projection db onto the minor axis, where for the line, the average segment length ASL is equal to da/db, and where for one or more segments, the computer system executes an outer loop having executable instructions to draw the segment with a segment length, SL, by performing the steps of, determining the number A of pixels to be drawn with A less than or equal to a maximum number C by performing a maximum of A+1 tests, but not more than C tests, of a condition, drawing A pixels, drawing U pixels where, $$U \leq SL \leq (U+C)$$

$$U \leq ASL \leq (U+C)$$

6. A line-draw method for drawing a line in a computer system relative to an axes system with a major axis and an orthogonal minor axis, where the line has a projection da onto the major axis and a projection db onto the minor axis, where for the line, the average segment length ASL is equal to da/db, and where the line includes a plurality of segments including a beginning segment, one or more middle segments and an end segment and for each middle segment, the computer system executes an outer loop having executable instructions to draw each middle segment with a segment length, SL, by performing the steps of, determining the number A of pixels to be drawn with A less than or equal to a maximum number C by performing a maximum of A+1 tests, but not more than C tests, of a condition, drawing A pixels, executing an unconditional loop having executable instructions "n" times where "n"=ULS and where ULS is the unconditional loop size representing the number of pixels drawn for each of the "n" executions of the unconditional loop, drawing U unconditional pixels, where, $$U \leq SL \leq (U+C)$$

$$U \leq ASL \leq (U+C)$$

drawing R remainder pixels, where,

R=U ULS.

7. A line-draw method for drawing a line in a computer system relative to an axes system with a major axis and an orthogonal minor axis, where the line has a projection da onto the major axis and a projection db onto the minor axis, where for the line, the average segment length ASL is equal to da/db, and where the line includes a plurality of segments including a beginning segment, one or more middle segments and an end segment and for each middle segment, the computer system, executes an outer loop having executable instructions to draw a middle segment with a segment length, SL, by performing the steps of, drawing a number U of unconditional pixels where, $U \leq SL$, executing an inner loop of executable instructions A times to determine an actual number A of conditional pixels to be drawn where A is less than or equal to a maximum number C including, performing a maximum of A+1 tests, but not more than C tests, of a conditional-pixel condition to determine that A conditional pixels are to be drawn, drawing one conditional pixel for each iteration of the inner loop.

8. A line-draw method for drawing a line in a computer system relative to an axes system with a major axis and an orthogonal minor axis, where the line has a projection da onto the major axis and a projection db onto the minor axis, where for the line, the average segment length ASL is equal to da/db, and where the line includes a plurality of segments including a beginning segment, one or more middle segments and an end segment and for each middle segment, the computer system, executes an outer loop having executable instructions to draw a middle segment with a segment length, SL, by performing the steps of, drawing a number U of unconditional pixels where,
    $U \leq SL$,
    U=2,
    $2 \leq SL$, executing an inner loop of executable instructions A times to determine an actual number A of conditional pixels to be drawn where A is less than or equal to a maximum number C including, performing a maximum of A+1 tests, but not more than C tests, of a conditional-pixel condition to determine that A conditional pixels are to be drawn, drawing one conditional pixel for each iteration of the inner loop.

9. A line-draw method for drawing a line in a computer system comprising, partitioning the line into a plurality of multi-pixel segments where each segment is formed of a number U of unconditional pixels and up to a maximum number C of conditional pixels, and for each segment,
        drawing U unconditional pixels,
        determining an actual number A of conditional pixels to be drawn where the actual number A is less than or equal to the maximum number C,
        drawing A conditional pixels.

10. The line-draw method of claim 9 wherein the line includes a beginning segment, one or more middle segments and an end segment.

11. The line-draw method of claim 9 wherein in the computer system, for each segment, a segment loop having executable instructions is executed in connection with drawing the line.

12. The line-draw method of claim 9 wherein in the computer system, one or more segment loops are provided where each segment loop includes executable instructions, and, for each segment, one of the segment loops is executed to draw the segment.

13. The line-draw method of claim 9 wherein in the computer system, one or more segment loops are provided where each segment loop includes executable instructions, including a conditional-pixel loop and, for each segment, one of the segment loops is executed in connection with drawing the segment and for each one of the actual number of conditional pixels in each segment, the conditional-pixel loop is executed.

14. The line-draw method of claim 9 wherein a plurality of different segment loops are provided where each segment loop includes executable instructions, and wherein segment loops are selected for execution to draw the line as a function of the direction and length of the line.

15. The line-draw method of claim 9 where the line is drawn relative to an axes system with a major axis and an orthogonal minor axis, where the line has a projection da onto the major axis and a projection db onto the minor axis, where for the line, an average segment length ASL is equal to da/db, and where for each middle segment, the computer system performs the steps of, executing an outer loop to draw a segment of segment length, SL, wherein,
    the determining step determines an actual number A of conditional pixels to be drawn where A is less than or equal to a maximum number C by performing a maximum of A+1 tests, but not more than C tests, of the conditional-pixel condition to determine that A conditional pixels are to be drawn,
    the conditional draw step draws A conditional pixels,
    the unconditional draw step draws U unconditional pixels,
    where, $$U \leq SL \leq (U+C)$$

$$U \leq ASL \leq (U+C)$$

16. A line-draw method for drawing lines in a computer system where the lines are drawn relative to an axes system with a major axis and an orthogonal minor axis, where each one of the lines has a projection da onto the major axis and a projection db onto the minor axis, where for each line, an average segment length ASL is equal to da/db for that line, the steps for any particular line of arbitrary direction or length comprising, providing a plurality of segment loops where each segment loop includes executable instructions, each segment loop for drawing a range of average segment lengths, said plurality of segment loops including a complete set of segment loops having a complete set of average segment lengths such that any line of arbitrary direction and length may be drawn, selecting one of the segment loops as the selected loop for said particular line, partitioning the particular line into a plurality of multi-pixel segments where each segment is formed of a number U of unconditional pixels and an actual number A of conditional pixels not greater than a maximum number C of conditional pixels, and for each segment of said particular line executing said selected segment loop as follows,
    drawing U unconditional pixels,
    determining the actual number A of conditional pixels to be drawn,
    drawing A conditional pixels.

17. The line-draw method of claim 14 wherein said execution performs the steps of, executing an outer loop to draw a segment of segment length, SL, where the outer loop includes executable instructions and wherein,
    the determining step determines an actual number A of conditional pixels to be drawn by performing a maximum of A+1 tests, but not more than C tests, of the conditional-pixel condition to determine that A conditional pixels are to be drawn,
    the conditional draw step draws A conditional pixels,
    the unconditional draw step draws U unconditional pixels,
    where, $$U \leq SL \leq (U+C)$$

$$U \leq ASL \leq (U+C)$$

18. The line-draw method of claim 16 wherein the range of average segment length for each one of the segment loops is limited such that for some maximum line length (MLL) of lines to be drawn, 19. The line-draw method of claim 18 wherein the axes system includes a single pair of orthogonal axes whereby ASL is limited such that.

20. The line-draw method of claim 18 wherein the axes system includes a two pairs of orthogonal axes whereby ASL is limited such that.

21. The line-draw method of claim 16 wherein said segment loops include single segment loops.

22. The line-draw method of claim 16 wherein said segment loops include double segment loops.

23. The line-draw method of claim 16 wherein said segment loops include single segment loops and double segment loops.

24. The line-draw method of claim 16 wherein said segment loops include single segment loops and modified double segment loops.

25. The line-draw method of claim 16 wherein said segment loops include an error term incremented with an error value each time a conditional pixel is drawn, said error term tested against an conditional-pixel condition to determine whether to draw a new conditional pixel.

26. The line-draw method of claim 16 wherein the line includes a beginning segment, one or more middle segments and an end segment, wherein said segment loops include an error term incremented with an error value each time a conditional pixel is drawn, said error term tested against an conditional-pixel condition to determine whether to draw a new conditional pixel, and wherein said error term is incremented for the beginning segment from the beginning of the line toward the middle segments and wherein said error term is incremented for the end segment from the end of the line toward the middle segments.

27. A line-draw apparatus for drawing a line in a computer system comprising, means for drawing a plurality of line segments to form the line where each line segment has a segment length SL and includes a number U of pixels and a number A of pixels whereby SL equals U+A and wherein for each line segment said means for drawing includes, means for drawing U pixels without condition evaluation, means for determining the number A of pixels to be drawn with condition evaluation, wherein said means for determining the number A of pixels is operational A times, means for drawing A pixels.

28. A line-draw apparatus for drawing a line in a computer system comprising, means for drawing a plurality of line segments to form the line where each line segment has a segment length SL and includes a number U of pixels and a number A of pixels whereby SL equals U+A, wherein said plurality of segments includes a beginning segment, one or more middle segments and an end segment and wherein for each line segment said means for drawing includes, means for drawing U pixels without condition evaluation, means for determining the number A of pixels to be drawn with condition evaluation, means for drawing A pixels.

29. A line-draw apparatus for drawing a line in a computer system where the line has a direction and a length, where the line is formed by a plurality of line segments and where, in the computer system, one or more segment loops having executable instructions are provided and, for each segment, one of the segment loops is executed to draw the segment, and wherein in response to one or more of said segment loops includes, said apparatus includes, means for drawing a number U of pixels unconditionally, means for determining an actual number A of pixels to be drawn as a function of a condition, and wherein said condition in the means for determining an actual number A of pixels to be drawn for each segment operates as a function of said direction and length, means for testing said condition once for each of said number A of pixels to be drawn, means for drawing A pixels.

30. A line-draw apparatus for drawing a line in a computer system where the line has a direction and a length, where the line is formed by a plurality of line segments and where, in the computer system, one or more segment loops having executable instructions are provided and, for each segment, one of the segment loops is executed to draw the segment, and wherein in response to one or more of said segment loops includes, said apparatus includes, means for drawing a number U of pixels unconditionally, means for determining an actual number A of pixels to be drawn as a function of a condition, and wherein the means for determining an actual number A of pixels to be drawn operates as a function of the direction and length, means for drawing A pixels.

31. A line-draw apparatus for drawing a line in a computer system relative to an axes system with a major axis and an orthogonal minor axis, where the line has a projection da onto the major axis and a projection db onto the minor axis, where for the line, the average segment length ASL is equal to da/db, and where for one or more segments, the computer system executes an outer loop having executable instructions to draw the segment with a segment length, SL, said apparatus comprising, means for determining the number A of pixels to be drawn with A less than or equal to a maximum number C including means for performing a maximum of A+1 tests, but not more than C tests, of a condition, means for drawing A pixels, means for drawing U pixels where, $$U \leq SL \leq (U+C)$$

$$U \leq ASL \leq (U+C)$$

32. A line-draw apparatus for drawing a line in a computer system relative to an axes system with a major axis and an orthogonal minor axis, where the fine has a projection da onto the major axis and a projection db onto the minor axis, where for the fine, the average segment length ASL is equal to da/db, and where the line includes a plurality of segments including a beginning segment, one or more middle segments and an end segment and for each middle segment, the computer system executes an outer loop having executable instructions to draw each middle segment with a segment length, SL, comprising, means for determining the number A of pixels to be drawn with A less than or equal to a maximum number C by performing a maximum of A+1 tests, but not more than C tests, of a condition, means for drawing A pixels, means for executing an unconditional loop having executable instructions "n" times where "n"=ULS and where ULS is the unconditional loop size representing the number of pixels drawn for each of the "n" executions of the unconditional loop, means for drawing U unconditional pixels, where, $$U \leq SL \leq (U+C)$$

$$U \leq ASL \leq (U+C)$$

means for drawing R remainder pixels, where,
R=U ULS.

* * * * *